(12) United States Patent
Shanley et al.

(10) Patent No.: US 12,417,090 B1
(45) Date of Patent: Sep. 16, 2025

(54) SOFTWARE DEVELOPMENT OBSERVABILITY PLATFORM

(71) Applicant: Splunk Inc., San Francisco, CA (US)

(72) Inventors: David Shanley, Manakin Sabot, VA (US); Mikhael Zharov, San Francisco, CA (US); Jacob Davis, Campbell, CA (US); Matthew Hanson, San Jose, CA (US); Thomas Beardsley Bender, Boulder, CO (US); Jackson Tsoi, Oakland, CA (US); Chieu Pham, San Jose, CA (US); James Harris, Maple (CA); Michael Combs, Santa Clara, CA (US); Pei Hsien Chu, San Jose, CA (US)

(73) Assignee: SPLUNK Inc., San Francisco, CA (US)

( * ) Notice: Subject to any disclaimer, the term of this patent is extended or adjusted under 35 U.S.C. 154(b) by 70 days.

(21) Appl. No.: 18/346,047

(22) Filed: Jun. 30, 2023

(51) Int. Cl.
| | |
|---|---|
| *G06F 8/60* | (2018.01) |
| *G06F 8/30* | (2018.01) |
| *G06F 8/41* | (2018.01) |
| *G06F 8/71* | (2018.01) |
| *G06F 9/445* | (2018.01) |
| *G06F 9/455* | (2018.01) |
| *G06F 11/07* | (2006.01) |
| *G06F 11/3698* | (2025.01) |

(52) U.S. Cl.
CPC .................. *G06F 8/71* (2013.01); *G06F 8/60* (2013.01); *G06F 11/3698* (2025.01)

(58) Field of Classification Search
CPC .......... G06F 8/71; G06F 11/3698; G06F 8/60; G06F 8/30; G06F 11/1438; G06F 11/0793; G06F 11/079; G06F 8/311; G06F 8/63; G06F 9/5055; G06F 9/445; G06F 11/368; G06F 8/65; G06F 11/3055; G06F 11/302; G06F 8/35; G06F 9/44505; G06F 8/61; H04L 67/34

See application file for complete search history.

(56) References Cited

U.S. PATENT DOCUMENTS

| 7,937,344 B2 | 5/2011 | Baum et al. |
| 8,112,425 B2 | 2/2012 | Baum et al. |

(Continued)

OTHER PUBLICATIONS

Splunk Enterprise 8.0.0 Overview, available online, retrieved May 20, 2020 from docs.splunk.com.

(Continued)

*Primary Examiner* — Thuy Dao
(74) *Attorney, Agent, or Firm* — Kilpatrick Townsend & Stockton LLP

(57) ABSTRACT

Techniques are described for providing a software-based platform used to collect and analyze data artifacts generated during software development processes and to display results of the analyses as actionable information. The software development observability platform is a software-based agent (also referred to as an "artifact collector") capable of capturing output from a wide variety of software development tools including compilers, test frameworks, code coverage and type checker tools, and the like. The artifact collector stores the data in an event data format and forwards the data to a data intake and query system or other destination for further analysis. In some examples, the software development observability platform further includes graphical user interfaces (GUIs) and other analysis tools that enable users to obtain insights into their software development processes.

20 Claims, 10 Drawing Sheets

(56) References Cited

U.S. PATENT DOCUMENTS

| | | | |
|---|---|---|---|
| 8,751,529 B2 | 6/2014 | Zhang et al. | |
| 8,788,525 B2 | 7/2014 | Neels et al. | |
| 9,215,240 B2 | 12/2015 | Merza et al. | |
| 9,286,413 B1 | 3/2016 | Coates et al. | |
| 10,127,258 B2 | 11/2018 | Lamas et al. | |
| 10,728,364 B1 * | 7/2020 | Licata | H04L 67/025 |
| 11,178,182 B2 * | 11/2021 | Saxena | H04L 63/102 |
| 11,468,151 B2 * | 10/2022 | Beckett, Jr. | H04L 63/102 |
| 11,989,539 B2 * | 5/2024 | Bregman | G06F 11/1438 |
| 12,067,392 B2 * | 8/2024 | Starr | G06F 8/447 |
| 2019/0098106 A1 | 3/2019 | Mungel et al. | |

OTHER PUBLICATIONS

Splunk Cloud 8.0.2004 User Manual, available online, retrieved May 20, 2020 from docs.splunk.com.

Splunk Quick Reference Guide, updated 2019, available online at https://www.splunk.com/pdfs/solution-guides/splunk-quick-reference-guide.pdf, retrieved May 20, 2020.

Carasso, David, "Exploring Splunk," published by CITO Research, New York, NY, Apr. 2012.

Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010

Jenkins "Blue Ocean" pulled from the Internet on Apr. 16, 2025 https://www.jenkins.io/doc/book/blueocean/, 6 pages.

Jenkins "Jenkins User Documentation" pulled from the Internet on Apr. 16, 2025 https://www.jenkins.io/doc/, 3 pages.

Jenkins "OpenTelemetry Plugin" pulled from the Internet on Apr. 16, 2025 https://www.jenkins.io/doc/pipeline/steps/optotelemetry, 4 pages.

Jenkins "Pipeline" pulled from the Internet on Apr. 16, 2025 https://www.jenkins.io/doc/book/pipeline/, 8 pages.

Jenkins "User Handbook Overview" pulled from the Internet on Apr. 16, 2025 https://www.jenkins.io/doc/book/getting-started/, 3 pages.

Jenkins "Using OpenTelemetry for Jenkins Jobs on ci.jenkins.io" pulled from the Internet on Apr. 16, 2025 https://www.jenkins.io/projects/gsoc/2024/project-ideas/using-opentelemetry-for-jenkins-jobs-on-ci_jenkins_io/, 7 pages.

* cited by examiner

Software Development
Observability Interface 300

SEARCH   DASHBOARDS   USAGE   GENERAL ▶   TEST FAILURES ▶   COVERAGE ▶   LATENCY ▶   | EDIT | EXPORT | ... |

*TOP TEST FAILURES* — 302

| TIME | REPO | PIPELINE TYPE | BRANCH | TARGET BRANCH | TEST FRAMEWORK | JOB |
|---|---|---|---|---|---|---|
| LAST 24 HRS ▶ | PROJECT1 ▶ X | ALL  X | NEXT ▶ X | NEXT ▶ X | ANY X | ANY ▶ |

TEST NAME

LIMIT: 5 ▶ X

POPULATING...

*MOST WANTED LIST* — 304

| Name ◀▶ | Job ◀▶ | Project ◀▶ | Failure Count ◀▶ | Failure Rate ◀▶ | Failures (last 10) ◀▶ | Ci_commit_author ◀▶ | Ci_commit_descr ◀▶ | Ci_commit_msg ◀▶ | Ci_commit_sha ◀▶ |
|---|---|---|---|---|---|---|---|---|---|
| Repost the hackertarget asset | Unpriv-unstable | project1 | 7 | 100% | 1 | John Doe, jod@example.com | Add additional unit test for health check API response... | Merge branch john/psaas-unit1 into 'next' | 06b73bd3878... |
| Repost the ipstack asset | Unpriv-unstable | project1 | 7 | 100% | 1 | Jane Doe, jad@example.com | Modify unit test... | Merge branch jane/test-4 into 'next' | 9fa4561bf0... |

OBTAINING, BY A SOFTWARE AGENT ASSOCIATED WITH A SOFTWARE DEVELOPMENT OBSERVABILITY PLATFORM, DATA GENERATED BY A COMPONENT OF A CONTINUOUS INTEGRATION AND CONTINUOUS DEPLOYMENT (CI/CD) PIPELINE MANAGED BY A SOFTWARE DEVELOPMENT PLATFORM, WHEREIN THE COMPONENT OF THE CI/CD PIPELINE IS INVOKED BASED ON CHANGES TO SOURCE CODE ASSOCIATED WITH A SOFTWARE PROJECT, AND WHEREIN THE SOFTWARE AGENT IS ASSOCIATED WITH CONFIGURATION INFORMATION IDENTIFYING: ONE OR MORE TYPES OF DATA TO EXTRACT FROM ARTIFACTS GENERATED BY COMPONENTS OF THE CI/CD PIPELINE, AND A DESTINATION TO WHICH TO SEND DATA EXTRACTED BY THE SOFTWARE AGENT
702

↓

GENERATING A TIMESTAMPED EVENT BASED ON THE DATA, WHEREIN A FORMAT OF THE TIMESTAMPED EVENT IS BASED ON A TYPE OF THE COMPONENT OF THE CI/CD PIPELINE
704

↓

SENDING THE TIMESTAMPED EVENT TO THE DESTINATION IDENTIFIED IN THE CONFIGURATION INFORMATION
706

FIG. 7

SOFTWARE DEVELOPMENT OBSERVABILITY PLATFORM

BACKGROUND

Software development teams today use continuous integration and continuous deployment ("CI/CD") pipelines to automate processes related to building, testing, and deploying software applications. CI/CD tools, for example, can be used to automatically integrate modifications made by developers to a software project's source code, to test modifications to the source code for errors or inefficiencies (e.g., by running unit tests, performing static code analysis, etc.), and to deploy the changes to a production environment or other computing environment.

BRIEF DESCRIPTION OF THE DRAWINGS

Illustrative examples are described in detail below with reference to the following figures:

FIG. 3 illustrates an example graphical user interface displaying information about test failures based on event data obtained generated by an artifact collector according to some examples.

FIG. 7 is a flowchart illustrating an example process for capturing CI/CD and other software development artifacts and sending timestamped event data generated from the artifacts to one or more destinations according to some examples.

DETAILED DESCRIPTION

Figure 1:
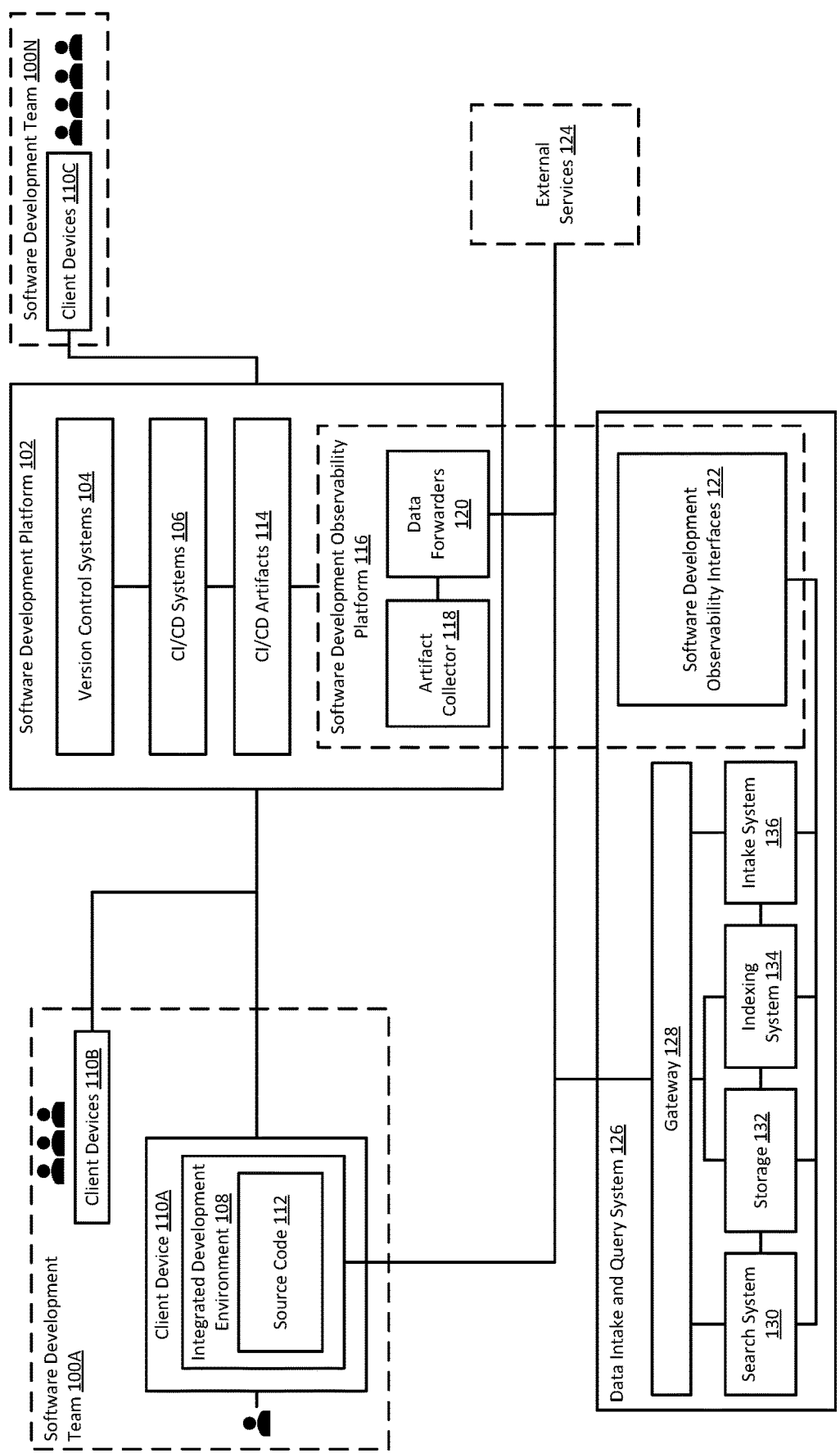
FIG. 1 is a diagram of an example computing environment in which a software development observability platform is used by software development teams to collect and analyze data artifacts generated during CI/CD and software development processes according to some examples.

The present disclosure relates to methods, apparatus, systems, and non-transitory computer-readable storage media for a software-based platform used to collect and analyze data artifacts generated during software development processes and to display results of the analyses as actionable information. The software development observability platform described herein includes, for example, a software-based agent (also referred to as an "artifact collector") capable of capturing output from a wide variety of software development tools including compilers, test frameworks, code coverage and type checker tools, and the like. The artifact collector stores the data in an event data format (e.g., where each event includes data generated by one or more of the software development tools and a timestamp) and forwards the data to a data intake and query system or other destination for further analysis. In some examples, the software development observability platform further includes graphical user interfaces (GUIs) and other analysis tools that enable users to obtain insights into their software development processes.

Today, software development teams typically use a variety of tools to automate aspects of the building, testing, and deployment phases of the software development life cycle. The processes implemented by such tools, collectively referred to continuous integration and continuous deployment ("CI/CD") processes or "pipelines," enable developers to readily integrate code changes into shared repositories, to run automated tests to detect errors and incompatibilities, and to automatically deploy code changes to production environments or other locations. Among other benefits, the use of CI/CD tools and processes can enable software development teams to improve the quality, speed, and reliability of their software development efforts.

Many of the CI/CD tools used to perform the tasks described above and others generate one or more types of data artifacts. These artifacts can include, for example, metadata generated by CI/CD applications describing execution of CI/CD pipelines, build time information generated by build tools, test results generated by various test frameworks, code coverage information, static code analysis reports, and the like. Typically, these artifacts may be stored temporarily and analyzed by developers only upon detection of specific issues with the resulting software applications.

While the data artifacts generated during the execution of CI/CD pipelines are typically not analyzed in depth, the data in aggregate and across time contains a wealth of useful information. For example, the data generated by the collection of build tools, testing frameworks, and other software development tools provides useful snapshots of a software project at moments in time, and many such snapshots are typically generated as the CI/CD tools are reused during development. The analysis of such data in a time-series manner can reveal interesting patterns and can help development teams to contextualize certain software development metrics (e.g., rates at which certain tests pass or fail, code coverage percentages, and the like). However, the varied data formats generated by CI/CD tools and the typically transitory nature of the data presents several challenges to analyzing the data across the lifespans of software development projects.

To address these and other challenges, the computer-implemented software development observability platform described herein enables software development teams to capture CI/CD and other software development data artifacts and to have the data artifacts ingested by one or more destination services or applications. As described in more detail herein, among other features, the software development observability platform can format and enrich the data as timestamped event data that facilitates analysis of temporal patterns and anomalies in the data. In some examples, the software development observability platform further includes dashboards and other interfaces that enable users to analyze the data artifacts, observe patterns and anomalies in the data over time, and to use the data as feedback to improve the quality of software development processes, among other benefits.

FIG. 1 is a diagram of an example computing environment in which a software development observability platform is used by software development teams to collect and analyze data artifacts generated during CI/CD and software development processes according to some examples. In FIG. 1, various software development teams (e.g., a software development team 100A, . . . , software development team 100N) use a software development platform 102 as part of their software development efforts. The example software development platform 102 includes functionality related to source code version control (e.g., managed by version control systems 104), issue tracking, code review, CI/CD (e.g., implemented by CI/CD systems 106), among other features. The software development platform 102 can be hosted in any of several different computing environments, including an option for software development teams to self-host the platform on the team's own servers, in a containerized environment, or using computing resources provided by a cloud provider network. Thus, although a single software development platform 102 is shown in FIG. 1, in other examples, each software development team can use a separate instance of the software development platform 102 running in any number of different types of computing environments. Furthermore, in other environments, version control systems 104, CI/CD systems 106, and other components can be used independently and without an organizing software development platform 102.

Software developers typically use an integrated development environment (e.g., an integrated development environment 108, or "IDE," running on a client device 110A) or other application to create and modify the source code (such as, e.g., source code 112) for software projects under development. Other software developers can use separate client devices (e.g., client devices 110B and client devices 110C) to work on the same or separate software projects, where the source code for such projects can be managed across software development teams using version control systems 104. Broadly, version control systems 104 include software tools that enable development teams to manage changes to source code over time. Using such tools, software development team can create one or more repositories where source code files are stored and managed by the version control systems 104, create copies of repositories to local client devices where developers can work on the source code, create branches or copies of the source code files for different features or tasks, make changes to the source code and commit the changes to the local repositories, and push the changes to a remote repository such that the changes can be shared with other members of a development team, among other features.

As indicated, in addition to the use of version control systems, many software development teams increasingly integrate CI/CD processes into their software development workflows. These CI/CD processes broadly help software developers to continuously build, test, and deploy iterative changes to the source code implementing their software projects. Among other benefits, these processes can help development teams reduce the likelihood of introducing faulty code into a software project and increase the speed with which project updates can be deployed to production environments. For example, as indicated, software development teams typically store the source code for software projects in one or more source code repositories and developers associated with a project can push code changes to a repository potentially many times a day. In this context, a configured CI/CD pipeline can be used to run scripts and other tools to build and test the software applications automatically as such changes are introduced. A software development team can configure a pipeline, for example, to automatically build and test a software application responsive to a user pushing a code change to a repository, optionally preview the changes, push the update for code review and approval, merge the changes into a default branch, deploy the changes to a designated environment, and the like, depending on particular pipeline's configurations.

Users can integrate CI/CD processes into their software development workflow by using the software development platform 102 or other interface to configure CI/CD systems 106 with different stages, scripts, and other environment configurations that comprise a CI/CD pipeline depending on an implementation of the CI/CD systems 106. In some examples, a CI/CD pipeline can be defined by configuration files or scripts that specify actions to be performed (sometimes referred to as "jobs" such as, e.g., compiling code, testing code, etc.), and the actions can be further grouped into stages defining when to run the actions (e.g., a first stage for compiling the code, one or more second stages to test the code once compiled, and so forth). The actions in each stage can be executed by a software development platform 102 sequentially or in parallel, and each of those actions can generate different types of artifacts depending on the type of the component of the CI/CD pipeline performing the action (e.g., a build tool, test framework, code coverage tool, etc.). The configuration of a pipeline's actions and stages can be performed by modifying one or more configuration files directly, using a GUI provided by the software development platform 102 to specifying pipeline configurations, or using any other type of interface used to access the software development platform 102 or associated CI/CD systems 106.

As indicated, the execution of many types of actions or jobs during invocation of a CI/CD pipeline results in one or more CI/CD artifacts 114. For example, a test job used to verify some or all portions of submitted code might generate reports or log data indicating which tests passed, which tests failed, an amount of time elapsed to execute each test, and so forth. Depending on the test framework used, the report data might be stored in one or more Extensible Markup Language (XML) files, JavaScript Object Notation (JSON) files, or other data format, and a given software project might include one or several different test frameworks. Other example types of jobs resulting in various types of CI/CD artifacts 114 can include, for example, accessibility tests, load performance tests, code coverage and code quality tests, license compliance tests, security tests, and the like. As illustrated, the amount and varied types and formats of data generated by portions of a CI/CD pipeline can be quite large and thus usefully analyzing the data presents several challenges.

According to examples described herein, a software development observability platform 116 enables software development teams to readily capture the output from CI/CD systems 106 and other software development processes. As shown, in some examples, the software development observability platform 116 includes an artifact collector 118, data forwarders 120, and software development observability interfaces 122. The software development observability platform 116 and components thereof can be implemented using program code executed using one or more computing devices. A computing device is an electronic device that has a memory for storing program code instructions and a hardware processor for executing the instructions. The computing device can further include other physical components, such as a network interface or components for input and output. The program code for the software development observability platform 116 can be stored on a non-transitory computer-readable medium, such as a magnetic or optical storage disk or a flash or solid-state memory, from which the program code can be loaded into the memory of the computing device for execution. "Non-transitory" means that the computer-readable medium can retain the program code while not under power, as opposed to volatile or "transitory" memory or media that requires power to retain data.

Broadly, in some examples, the artifact collector 118 obtains CI/CD artifacts 114 during or after the execution of one or more CI/CD pipelines, stores data obtained from the CI/CD artifacts 114 as timestamped event data, and provides the timestamped event data to data forwarders 120. The data forwarders 120 can then send the timestamped event data to one or more configured destinations such as, for example, a data intake and query system 126, external services 124 (e.g., storage services, data analysis services, etc.), standard outputs, files, and so forth, where the data can be analyzed as desired. In the example of a data intake and query system 126, the data can be sent to the data intake and query system 126 via a gateway 128. An intake system 136 of the data intake and query system 126 can then process the data in part by indexing the event data using the indexing system 134, storing the data in storage 132, thereby causing the event data to be accessible to a search system 130. Additional details related to the operation of a software development observability platform 116 and data intake and query system 126 are provided hereinafter. Once stored in the data intake and query system 126 or elsewhere, in some examples, users can use software development observability interfaces 122 to view dashboards and interfaces displaying analyses based on the stored data.

Figure 2:
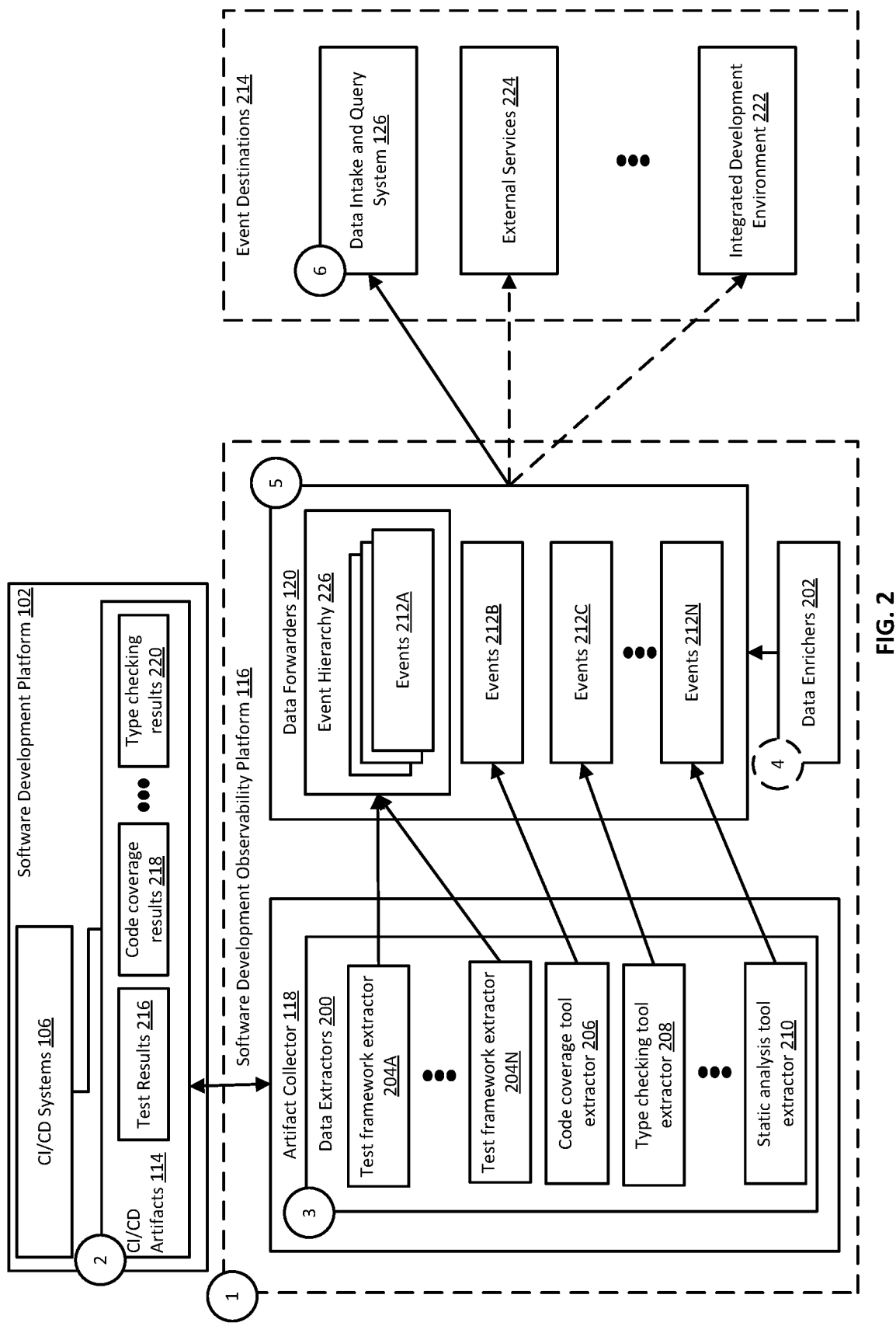
FIG. 2 illustrates additional details of the components and operation of a software development observability platform according to some examples.

FIG. 2 illustrates additional details of the components and operation of a software development observability platform according to some examples. In FIG. 2, the numbered circles "1"-"6" illustrate an example process for using at least a portion of the software development observability platform 116. For example, the described process includes configuration of the software development observability platform 116 for integration with CI/CD systems 106, an artifact collector 118 obtaining data generated by components of an invoked CI/CD pipeline and generating timestamped events based on the obtained data (where a format of the timestamped events is based on the types of the components of the CI/CD pipeline from which the data is obtained), one or more data enrichers 202 optionally supplementing the generated event data with additional context information, and data forwarders 120 sending the generated timestamped event data to one or more event destinations 214.

As indicated, in some examples, the software development observability platform 116 includes an artifact collector 118. In some examples, the artifact collector 118 is a software-based agent that captures artifacts generated by a wide range of software development-related tools such as, for example, software development platforms, compilers, testing frameworks, code coverage tools, static analysis tools, and the like. Depending on a type of computing environment in which the software development observability platform 116 is to be used, in some examples, the artifact collector 118 can be provided as a standalone executable that can be installed at a location that provides the artifact collector 118 with access to data generated by components of the software development platform 102. In some examples, the artifact collector 118, data forwarders 120, and data enrichers 202 can be packaged together in a same executable or, in other implementations, provided as separate executable modules.

In some examples, the artifact collector 118, data forwarders 120, and data enrichers 202 can be integrated with a CI/CD pipeline in part by adding actions to pipeline configurations used by CI/CD systems 106 to execute CI/CD pipelines. The actions can include, for example, obtaining a software agent implementing the artifact collector 118, data enrichers 202, and data forwarders 120 from a repository or other storage location, configuring one or more types of data extractors 200 corresponding to components of a CI/CD pipeline from which it is desired to collect data, optionally configuring one or more data enrichers 202 used to add metadata to events generated by the data extractors 200, and configuring one or more data forwarders 120 indicating where generated event data is to be sent. The configuration snippet below, for example, illustrates the configuration of some of these details:

```
...
.configure_collector:
    script:
        - curl http://repo.example.com/.../collector -o collector
        - chmod +x ./collector
        - |
            cat > collector_config.yml << EOF
            enrichers:
              - gitlab
            forwarders:
              - data_intake_query_system
...
```

As shown, the configuration includes actions used to cause the software development platform 102 to obtain the software agent implementing the artifact collector 118 and data forwarders 120 from a remote storage location (e.g., "curl http://srepo.example.com/ . . . /collector–o collector"), that enable execution of the obtained software agent (e.g., "chmod+x./collector"), and that create additional configuration information to be used by the software agent (e.g., specifying one more data enrichers 202 and data forwarders 120 to be used by the artifact collector 118). Using the example configuration information above, actions to use the artifact collector can be added to a CI/CD pipeline configuration to extract specific types of data. The example below shows the addition of a data extractor 200 to a CI/CD pipeline script with reference to the general configuration information shown above:

```
...
python-unit-tests:
    stage: testing
    script:
        - make run_python_tests
    after_script:
        - !reference [.configure_collector, script]
        - ./collector extract junit tests/report.xml --test-framework junit
        - ./collector extract python-coverage tests/coverage.json --test-framework pytest
...
```

In this example, the configuration adds an action to invoke the artifact collector 118 with the "extract" command and further identifies a type and location of the data to be collected (e.g., JUnit test framework data located at "tests/report.xml"). A second action is specified with an "extract" command for a different type of data to be collected (e.g., code coverage data generated by the Pytest test framework data and located at "tests/coverage.json"). These configurations can be added, for example, as part of the scripts more broadly defining a CI/CD pipeline to be invoked by the software development platform 102 responsive to users pushing updates to source code or other triggers. As shown, configuration settings can either be specified as part of a configuration file, as part of the commands invoking the particular modules, or combinations of both. Example types of configuration settings include, but are not limited to, an indication of whether to output debug messages, a list of enrichers to use, a list of collectors to use, a list of data forwarders to use, a list of fields to use for specific enrichers, names to use for test sagas, test types, test frameworks, test packages, and the like.

As illustrated, the artifact collector 118 can include several different types of data extractors 200, each configured to obtain data from one or more particular testing frameworks, code coverage tools, and so forth. As shown in FIG. 2, the data extractors 200 can include a general-purpose extractor, different extractors for different types of test frameworks (test framework extractor 204A, . . . , test framework extractor 204N), code coverage tool extractors (e.g., code coverage tool extractor 206), type check tool extractors (e.g., type checking tool extractor 208), static analysis tool extractors (e.g., static analysis tool extractor 210), and so forth. The use of the data extractors 200 can be selectively added to a CI/CD pipeline by specifying their invocation in the CI/CD configuration scripts as indicated above, or using any other type of interface provided by the software development platform 102. As one example, a general-purpose extractor can use an API (e.g., a published REST API) of a framework, e.g., to obtain job and pipeline results and durations from a pipeline of interest, and output result data such as a pipeline result, job result, etc. At circle "3" in FIG. 2, these data extractors 200 are invoked during or after the invocation of a CI/CD pipeline depending on their inclusion in CI/CD pipeline configuration data, as described above, resulting in the generation of event data (such as, e.g., events 212A, events 212B, events 212C, . . . , events 212N).

In some examples, the data extractors 200 normalize the obtained data into event formats that can be used by one or more other extractors that obtain data from similar data sources. For example, a software development pipeline might include several different test frameworks (e.g., to perform different types of tests, to test different types of programming languages, etc.), but the artifacts generated by each of the test frameworks typically includes similar information such as, e.g., what tests ran, how long the tests took to run, what tests passed/failed, what test suite they belong to, etc. The data extractors can thus generate events 212A for artifacts obtained from the different test frameworks by normalizing the information into a common format. In some examples, an event hierarchy 226 can be created for certain types of events, where each level in the hierarchy 226 represents successively granular information. For example, in the context of test frameworks, a first-level event can be created corresponding a "test saga," representing the overall outcome of a test saga consisting of one or more test suites, one or more second-level events corresponding to "test suites," representing the outcome of one or more test suits each consisting of one or more test cases, and one or more third-level events corresponding to "test cases," each representing the outcome of a test cases consisting of one or more test steps and assertions. These data objects can include properties such as a name, description, execution time, success or failure indicators, traces, etc. Other types of extractors can create objects based on other abstract formats such as, e.g., a format for CI pipeline results, CI job results, test results 216, code coverage results 218, type checking results 220, and the like, where hierarchies may be appropriate in some cases and not others.

In some examples, at circle "4," an artifact collector 118 can further optionally use one or more data enrichers 202 used to supplement the data obtained by the data extractors 200. For example, one type of data enricher 202 can be used to obtain environment variables associated with an instance of the software development platform 102 and include that data as metadata with the events generated by the extractors. In the context of an enricher related to a software development platform 102, the metadata added to events can include an identifier of the CI/CD pipeline, an identifier of the component of the CI/CD pipeline generating one or more corresponding artifacts, an identifier of a user submitted the changes to the source code, an identifier of a repository to which the changes to the source code were submitted, and identifier of a version control branch with which the changes to the source code are associated, or a type of test framework that generated the data. As illustrated elsewhere herein, among other uses, the metadata can be used by the software development observability interfaces 122 and other analysis tools to filter the display of information based on particular repositories, committers, and so forth. As illustrated above, the use of data enrichers 202 can be configured as part of the configuration information used to integrate the artifact collector 118 and data forwarders 120 into the CI/CD pipeline managed by the software development platform 102.

The following is an example excerpt from an event generated by a data extractor 200 and optionally supplemented by one or more data enrichers 202:

```
{
  "event_type": "TestCaseResult",
  "latency": 4.200,
  "name": "testing a fxn",
  "status": "fail",
  "test_framework": "junit",
  "test_saga_name": "Test run for Service A",
  "test_suite_name": "Feature B Test Suite",
  "test_type": "unit",
  "timestamp": "2021-12-03T11:57:58-08:00"
  "CI_COMMIT_BRANCH": "main",
  "CI_JOB_NAME": "python-unit-tests",
  "CI_JOB_STAGE": "testing",
  "CI_PIPELINE_ID": "3992285",
  ....
}
```

As illustrated, the event includes a number of name-value pairs describing information obtained from one or more CI/CD artifacts 114 or added by a data enricher 202. In the example above, the event includes information derived from results generated by a test framework, including information about a number of tests performed, a timestamp, and information about the CI/CD pipeline added by an enricher (e.g., "CICD_USER_NAME: John Doe").

Once an artifact collector 118 generates the events, the events can be provided to data forwarders 120 used to send the data generated by one or more extractors, and optionally enriched by one or more enrichers, to one or more event destinations 214. As shown in the example of FIG. 2 at circle "6," the event destinations 214 can include a data intake and query system 126, external services 124, an integrated development environment 108, or any other destination. In some examples, the architecture is plug-in based and support for additional event destinations 214 can be added by the creation of a data forwarder 120 capable of interfacing with a particular destination. For example, a data forwarder 120 can be created for sending events to an integrated development environment 222 in a format supported by the integrated development environment such that, for example, the integrated development environment can show information about test framework results, code coverage results, and so forth directly in the integrated development environment. Other types of event destinations 214 can process and analyze the received events as desired.

FIG. 3 illustrates an example graphical user interface displaying information about test failures based on event data obtained generated by an artifact collector according to some examples. For example, the interface 300 includes a table 302 illustrating test cases sorted by a number or rate of failures for the test case, or other desirable field, based on CI/CD data collected by a software development observability platform 116. The interface 300 further includes filters 304 that enable users to filter the data displayed in the table 302 based on one or more fields included in the event data generated by the software development observability platform 116.

Figure 4:
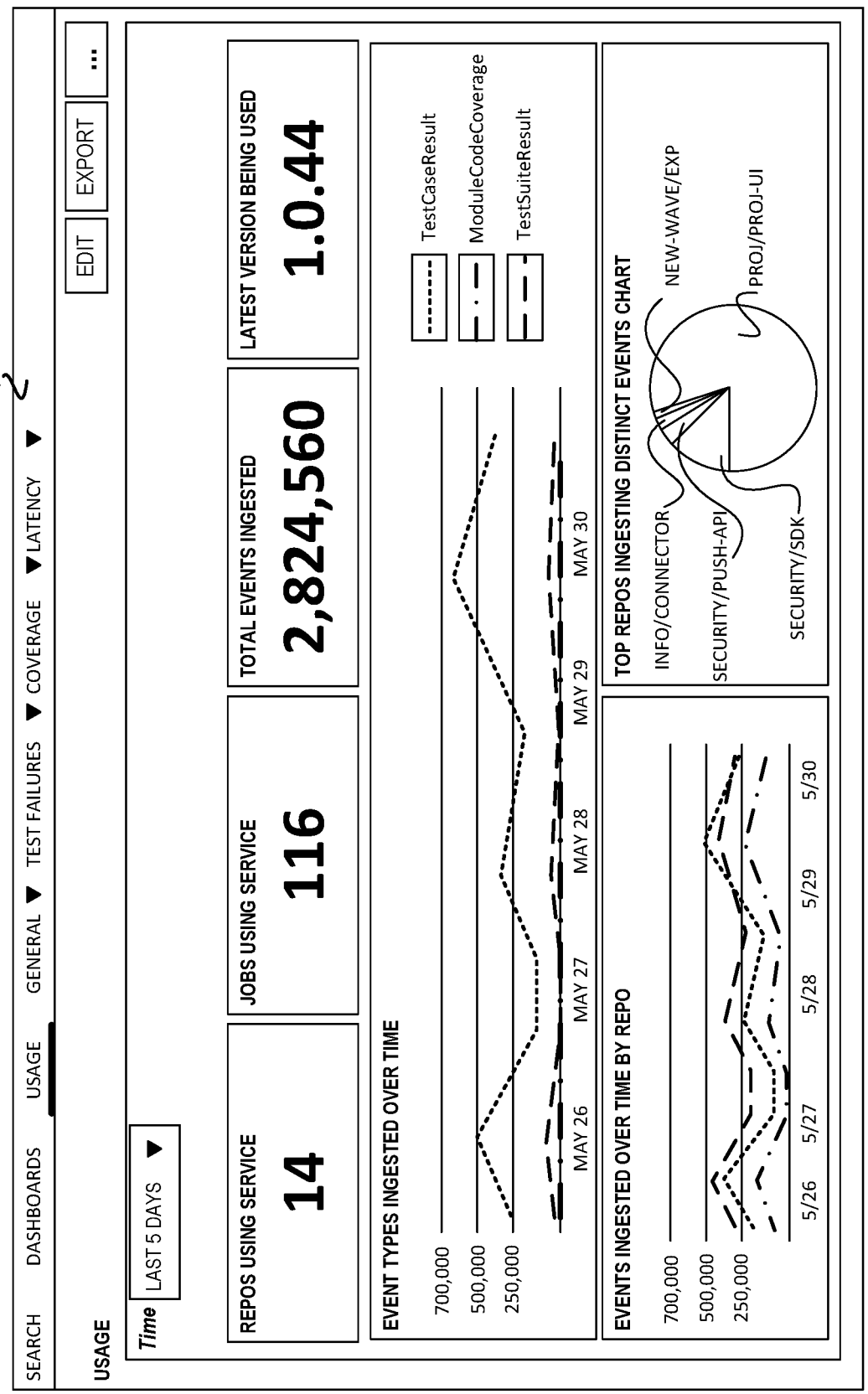
FIG. 4 illustrates an example graphical user interface displaying information about usage of the software development observability platform according to some examples.

FIG. 4 illustrates an example graphical user interface displaying information about usage of the software development observability platform according to some examples. The interface 400, for example, includes a dashboard including interface elements indicating a number of repositories using the software development observability platform 116, a number of software development platform 102 jobs using the software development observability platform 116, a total number of events generated by the platform, and the like. The interface 400 further includes graphs that illustrate metrics over time such as, for example, a number of events generated over time (where the number of particular types of events can be observed), a number of events generated by repository, and so forth.

Figure 5:
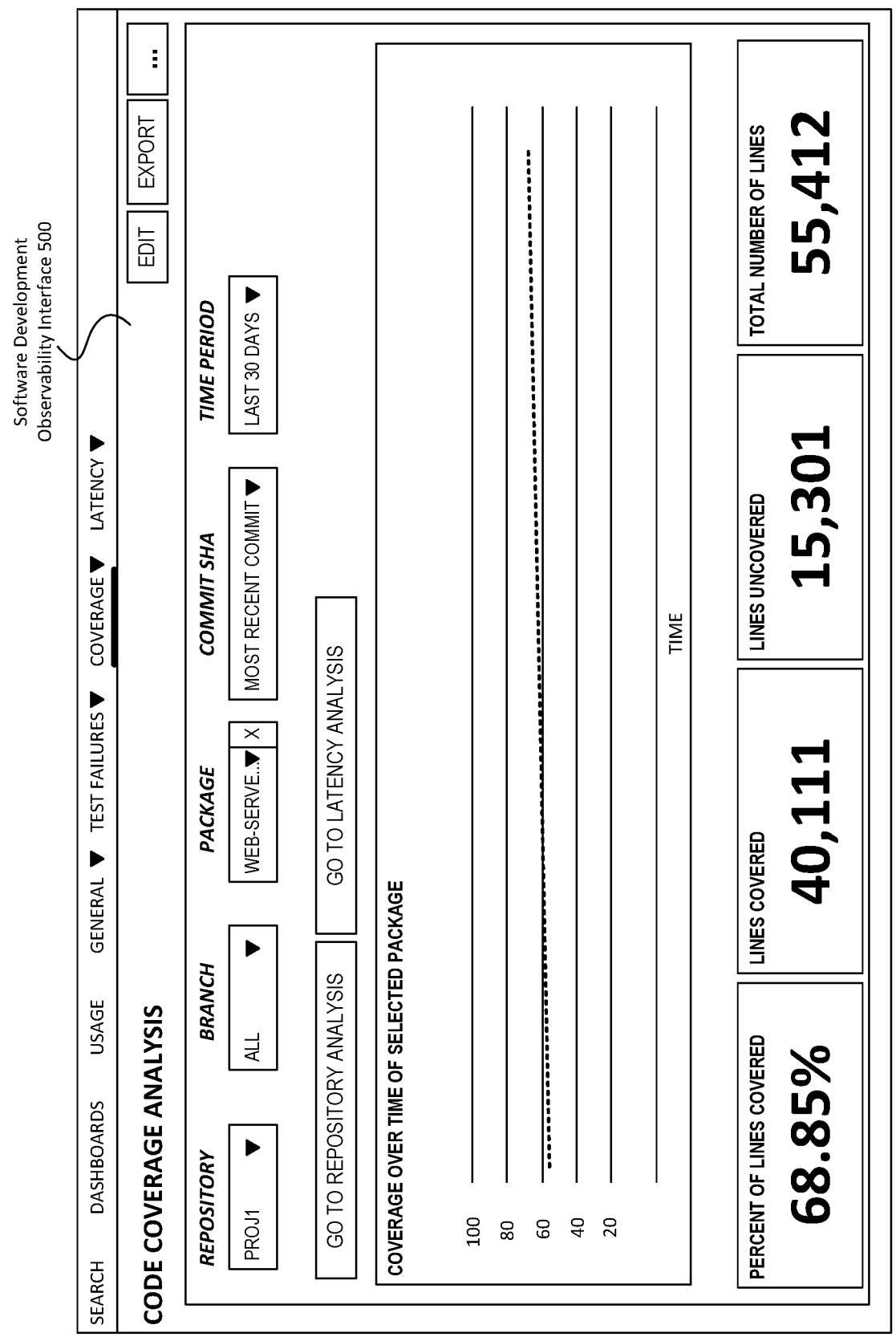
FIG. 5 illustrates an example graphical user interface displaying information derived from artifacts generated by a code coverage tool according to some examples.

FIG. 5 illustrates an example graphical user interface displaying information derived from artifacts generated by a code coverage tool according to some examples. The interface 500, for example, includes a graph indicating, for a period of time, a number of lines of code covered by a test suite. Similar to other interfaces, the interface 500 includes interface elements that enable users to filter the display based on particular repositories, version control branches, packages, time periods, and so forth.

Figure 6:
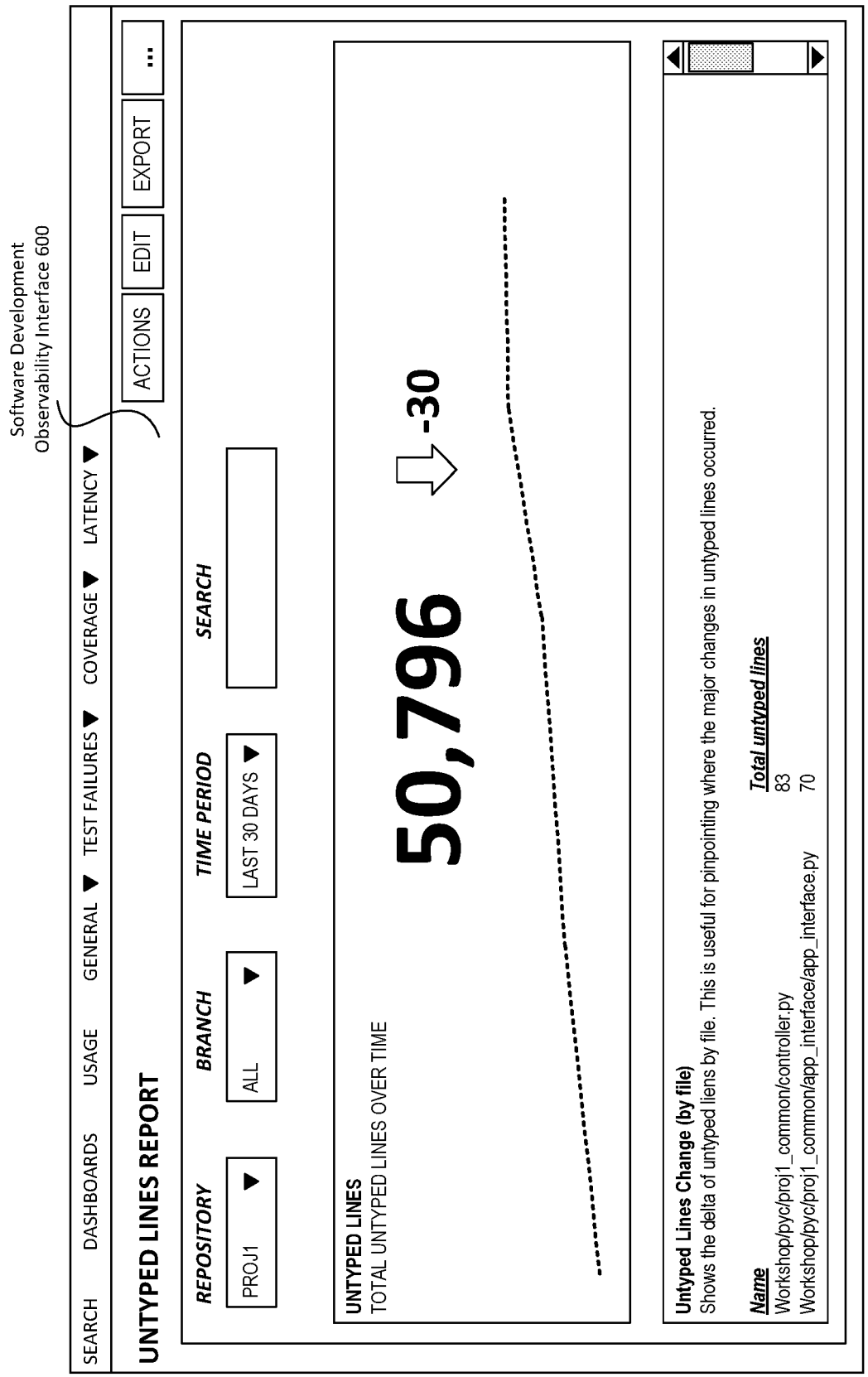
FIG. 6 illustrates an example graphical user interface displaying information about artifacts generated by a type checking tool according to some examples.

FIG. 6 illustrates an example graphical user interface displaying information about artifacts generated by a type checking tool according to some examples. As shown, the interface 600 includes a graph indicating, for a period of time, a number of lines of a software project verified by a type checking tool. The interface 600 further includes display of files containing a greatest number of untyped lines and interface elements that enable users to filter the data based on various fields contained in the event data from which the displayed information derives. As illustrated by these and other interfaces, a wide range of information can be displayed based on event data generated by a software development observability platform 116.

FIG. 7 is a flowchart illustrating an example process 700 for capturing CI/CD and other software development artifacts and sending timestamped event data generated from the artifacts to one or more destinations according to some examples. The example process 700 can be implemented, for example, by a computing device that comprises a processor and a non-transitory computer-readable medium. The non-transitory computer readable medium can be storing instructions that, when executed by the processor, can cause the processor to perform the operations of the illustrated process 700. Alternatively or additionally, the process 700 can be implemented using a non-transitory computer-readable medium storing instructions that, when executed by one or more processors, cause the one or more processors to perform the operations of the process 700 of FIG. 7.

The process 700 includes, at block 702, obtaining, by a software agent associated with a software development observability platform, data generated by a component of a continuous integration and continuous deployment (CI/CD) pipeline managed by a software development platform, wherein the component of the CI/CD pipeline is invoked based on changes to source code associated with a software project, and wherein the software agent is associated with configuration information identifying: one or more types of data to extract from artifacts generated by components of the CI/CD pipeline, and a destination to which to send data extracted by the software agent.

The process 700 further includes, at block 704, generating a timestamped event based on the data, wherein a format of the timestamped event is based on a type of the component of the CI/CD pipeline.

The process 700 further includes, at block 706, sending the timestamped event to the destination identified in the configuration information.

Entities of various types, such as companies, educational institutions, medical facilities, governmental departments, and private individuals, among other examples, operate computing environments for various purposes. Computing environments, which can also be referred to as information technology environments, can include inter-networked, physical hardware devices, the software executing on the hardware devices, and the users of the hardware and software. As an example, an entity such as a school can operate a Local Area Network (LAN) that includes desktop computers, laptop computers, smart phones, and tablets connected to a physical and wireless network, where users correspond to teachers and students. In this example, the physical devices may be in buildings or a campus that is controlled by the school. As another example, an entity such as a business can operate a Wide Area Network (WAN) that includes physical devices in multiple geographic locations where the offices of the business are located. In this example, the different offices can be inter-networked using a combination of public networks such as the Internet and private networks. As another example, an entity can operate a data center: a centralized location where computing resources are kept and maintained, and whose resources are accessible over a network. In this example, users associated with the entity that operates the data center can access the computing resources in the data center over public and/or private networks that may not be operated and controlled by the same entity. Alternatively or additionally, the operator of the data center may provide the computing resources to users associated with other entities, for example on a subscription basis. In both of these examples, users may expect resources to be available on demand and without direct active management by the user, a resource delivery model often referred to as cloud computing.

Entities that operate computing environments need information about their computing environments. For example, an entity may need to know the operating status of the various computing resources in the entity's computing environment, so that the entity can administer the environment, including performing configuration and maintenance, performing repairs or replacements, provisioning additional resources, removing unused resources, or addressing issues that may arise during operation of the computing environment, among other examples. As another example, an entity can use information about a computing environment to identify and remediate security issues that may endanger the data, users, and/or equipment in the computing environment. As another example, an entity may be operating a computing environment for some purpose (e.g., to run an online store, to operate a bank, to manage a municipal railway, etc.) and information about the computing environment can aid the entity in understanding whether the computing environment is serving its purpose well.

A data intake and query system can ingest and store data obtained from the components in a computing environment, and can enable an entity to search, analyze, and visualize the data. Through these and other capabilities, the data intake and query system can enable an entity to use the data for administration of the computing environment, to detect security issues, to understand how the computing environment is performing or being used, and/or to perform other analytics.

Figure 8:
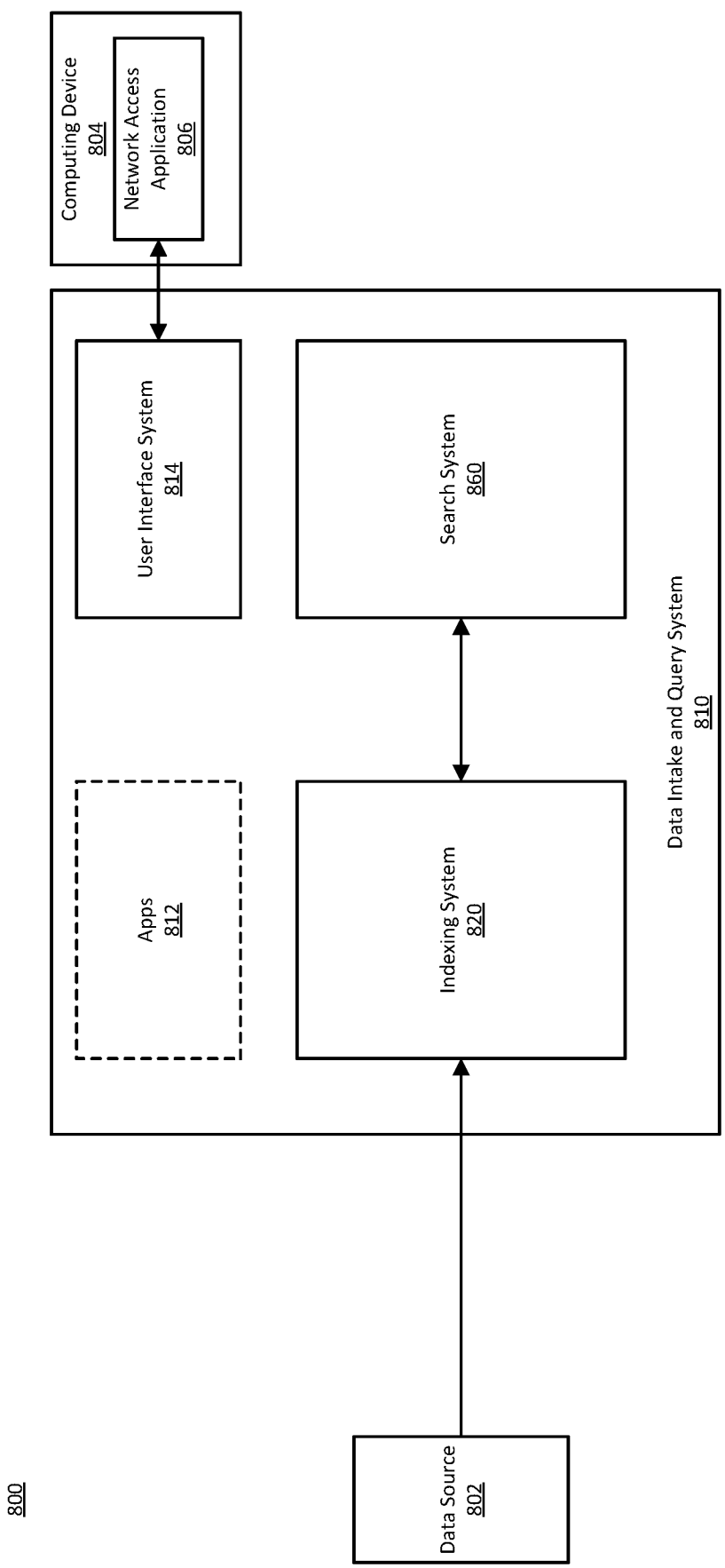
FIG. 8 is a block diagram illustrating an example computing environment that includes a data intake and query system according to some examples.

FIG. 8 is a block diagram illustrating an example computing environment 800 that includes a data intake and query system 810. The data intake and query system 810 obtains data from a data source 802 in the computing environment 800, and ingests the data using an indexing system 820. A search system 860 of the data intake and query system 810 enables users to navigate the indexed data. Though drawn with separate boxes, in some implementations the indexing system 820 and the search system 860 can have overlapping components. A computing device 804, running a network access application 806, can communicate with the data intake and query system 810 through a user interface system 814 of the data intake and query system 810. Using the computing device 804, a user can perform various operations with respect to the data intake and query system 810, such as administration of the data intake and query system 810, management and generation of "knowledge objects," initiating of searches, and generation of reports, among other operations. The data intake and query system 810 can further optionally include apps 812 that extend the search, analytics, and/or visualization capabilities of the data intake and query system 810.

The data intake and query system 810 can be implemented using program code that can be executed using a computing device. A computing device is an electronic device that has a memory for storing program code instructions and a hardware processor for executing the instructions. The computing device can further include other physical components, such as a network interface or components for input and output. The program code for the data intake and query system 810 can be stored on a non-transitory computer-readable medium, such as a magnetic or optical storage disk or a flash or solid-state memory, from which the program code can be loaded into the memory of the computing device for execution. "Non-transitory" means that the computer-readable medium can retain the program code while not under power, as opposed to volatile or "transitory" memory or media that requires power in order to retain data.

In various examples, the program code for the data intake and query system 810 can execute on a single computing device, or may be distributed over multiple computing devices. For example, the program code can include instructions for executing both indexing and search components (which may be part of the indexing system 820 and/or the search system 860, respectively), and can be executed on a computing device that also provides the data source 802. As another example, the program code can execute on one computing device, where the program code executes both indexing and search components, while another copy of the program code executes on a second computing device that provides the data source 802. As another example, the program code can execute only an indexing component or only a search component. In this example, a first instance of the program code that is executing the indexing component and a second instance of the program code that is executing the search component can be executing on the same computing device or on different computing devices.

The data source 802 of the computing environment 800 is a component of a computing device that produces machine data. The component can be a hardware component (e.g., a microprocessor or a network adapter, among other examples) or a software component (e.g., a part of the operating system or an application, among other examples). The component can be a virtual component, such as a virtual machine, a virtual machine monitor (also referred as a hypervisor), a container, or a container orchestrator, among other examples. Examples of computing devices that can provide the data source 802 include personal computers (e.g., laptops, desktop computers, etc.), handheld devices (e.g., smart phones, tablet computers, etc.), servers (e.g., network servers, compute servers, storage servers, domain name servers, web servers, etc.), network infrastructure devices (e.g., routers, switches, firewalls, etc.), and "Internet of Things" devices (e.g., vehicles, home appliances, factory equipment, etc.), among other examples. Machine data is electronically generated data that is output by the component of the computing device and reflects activity of the component. Such activity can include, for example, operation status, actions performed, performance metrics, communications with other components, or communications with users, among other examples. The component can produce machine data in an automated fashion (e.g., through the ordinary course of being powered on and/or executing) and/or as a result of user interaction with the computing device (e.g., through the user's use of input/output devices or applications). The machine data can be structured, semi-structured, and/or unstructured. The machine data may be referred to as raw machine data when the data is unaltered from the format in which the data was output by the component of the computing device. Examples of machine data include operating system logs, web server logs, live application logs, network feeds, metrics, change monitoring, message queues, and archive files, among other examples.

As discussed in greater detail below, the indexing system 820 obtains machine date from the data source 802 and processes and stores the data. Processing and storing of data may be referred to as "ingestion" of the data. Processing of the data can include parsing the data to identify individual events, where an event is a discrete portion of machine data that can be associated with a timestamp. Processing of the data can further include generating an index of the events, where the index is a data storage structure in which the events are stored. The indexing system 820 does not require prior knowledge of the structure of incoming data (e.g., the indexing system 820 does not need to be provided with a schema describing the data). Additionally, the indexing system 820 retains a copy of the data as it was received by the indexing system 820 such that the original data is always available for searching (e.g., no data is discarded, though, in some examples, the indexing system 820 can be configured to do so).

The search system 860 searches the data stored by the indexing 820 system. As discussed in greater detail below, the search system 860 enables users associated with the computing environment 800 (and possibly also other users) to navigate the data, generate reports, and visualize results in "dashboards" output using a graphical interface. Using the facilities of the search system 860, users can obtain insights about the data, such as retrieving events from an index, calculating metrics, searching for specific conditions within a rolling time window, identifying patterns in the data, and predicting future trends, among other examples. To achieve greater efficiency, the search system 860 can apply map-reduce methods to parallelize searching of large volumes of data. Additionally, because the original data is available, the search system 860 can apply a schema to the data at search time. This allows different structures to be applied to the same data, or for the structure to be modified if or when the content of the data changes. Application of a schema at search time may be referred to herein as a late-binding schema technique.

The user interface system 814 provides mechanisms through which users associated with the computing environment 800 (and possibly others) can interact with the data intake and query system 810. These interactions can include configuration, administration, and management of the indexing system 820, initiation and/or scheduling of queries to the search system 860, receipt or reporting of search results, and/or visualization of search results. The user interface system 814 can include, for example, facilities to provide a command line interface or a web-based interface.

Users can access the user interface system 814 using a computing device 804 that communicates with data intake and query system 810, possibly over a network. A "user," in the context of the implementations and examples described herein, is a digital entity that is described by a set of information in a computing environment. The set of information can include, for example, a user identifier, a username, a password, a user account, a set of authentication credentials, a token, other data, and/or a combination of the preceding. Using the digital entity that is represented by a user, a person can interact with the computing environment 800. For example, a person can log in as a particular user and, using the user's digital information, can access the data intake and query system 810. A user can be associated with one or more people, meaning that one or more people may be able to use the same user's digital information. For example, an administrative user account may be used by multiple people who have been given access to the administrative user account. Alternatively or additionally, a user can be associated with another digital entity, such as a bot (e.g., a software program that can perform autonomous tasks). A user can also be associated with one or more entities. For example, a company can have associated with it a number of users. In this example, the company may control the users' digital information, including assignment of user identifiers, management of security credentials, control of which persons are associated with which users, and so on.

The computing device 804 can provide a human-machine interface through which a person can have a digital presence in the computing environment 800 in the form of a user. The computing device 804 is an electronic device having one or more processors and a memory capable of storing instructions for execution by the one or more processors. The computing device 804 can further include input/output (I/O) hardware and a network interface. Applications executed by the computing device 804 can include a network access application 806, which can a network interface of the client computing device 804 to communicate, over a network, with the user interface system 814 of the data intake and query system 810. The user interface system 814 can use the network access application 806 to generate user interfaces that enable a user to interact with the data intake and query system 810. A web browser is one example of a network access application. A shell tool can also be used as a network access application. In some examples, the data intake and query system 810 is an application executing on the computing device 806. In such examples, the network access application 806 can access the user interface system 814 without needed to go over a network.

The data intake and query system 810 can optionally include apps 812. An app of the data intake and query system 810 is a collection of configurations, knowledge objects (a user-defined entity that enriches the data in the data intake and query system 810), views, and dashboards that may provide additional functionality, different techniques for searching the data, and/or additional insights into the data. The data intake and query system 810 can execute multiple applications simultaneously. Example applications include an information technology service intelligence application, which can monitor and analyze the performance and behavior of the computing environment 800, and an enterprise security application, which can include content and searches to assist security analysts in diagnosing and acting on anomalous or malicious behavior in the computing environment 800.

Though FIG. 8 illustrates only one data source, in practical implementations, the computing environment 800 contains many data sources spread across numerous computing devices. The computing devices may be controlled and operated by a single entity. For example, in an "on the premises" or "on-prem" implementation, the computing devices may physically and digitally be controlled by one entity, meaning that the computing devices are in physical locations that are owned and/or operated by the entity and are within a network domain that is controlled by the entity. In an entirely on-prem implementation of the computing environment 800, the data intake and query system 810 executes on an on-prem computing device and obtains machine data from on-prem data sources. An on-prem implementation can also be referred to as an "enterprise" network, though the term "on-prem" refers primarily to physical locality of a network and who controls that location while the term "enterprise" may be used to refer to the network of a single entity. As such, an enterprise network could include cloud components.

"Cloud" or "in the cloud" refers to a network model in which an entity operates network resources (e.g., processor capacity, network capacity, storage capacity, etc.), located for example in a data center, and makes those resources available to users and/or other entities over a network. A "private cloud" is a cloud implementation where the entity provides the network resources only to its own users. A "public cloud" is a cloud implementation where an entity operates network resources in order to provide them to users that are not associated with the entity and/or to other entities. In this implementation, the provider entity can, for example, allow a subscriber entity to pay for a subscription that enables users associated with subscriber entity to access a certain amount of the provider entity's cloud resources, possibly for a limited time. A subscriber entity of cloud resources can also be referred to as a tenant of the provider entity. Users associated with the subscriber entity access the cloud resources over a network, which may include the public Internet. In contrast to an on-prem implementation, a subscriber entity does not have physical control of the computing devices that are in the cloud, and has digital access to resources provided by the computing devices only to the extent that such access is enabled by the provider entity.

In some implementations, the computing environment 800 can include on-prem and cloud-based computing resources, or only cloud-based resources. For example, an entity may have on-prem computing devices and a private cloud. In this example, the entity operates the data intake and query system 810 and can choose to execute the data intake and query system 810 on an on-prem computing device or in the cloud. In another example, a provider entity operates the data intake and query system 810 in a public cloud and provides the functionality of the data intake and query system 810 as a service, for example under a Software-as-a-Service (SaaS) model. In this example, the provider entity can provision a separate tenant (or possibly multiple tenants) in the public cloud network for each subscriber entity, where each tenant executes a separate and distinct instance of the data intake and query system 810. In some implementations, the entity providing the data intake and query system 810 is itself subscribing to the cloud services of a cloud service provider. As an example, a first entity provides computing resources under a public cloud service model, a second entity subscribes to the cloud services of the first provider entity and uses the cloud computing resources to operate the data intake and query system 810, and a third entity can subscribe to the services of the second provider entity in order to use the functionality of the data intake and query system 810. In this example, the data sources are associated with the third entity, users accessing the data intake and query system 810 are associated with the third entity, and the analytics and insights provided by the data intake and query system 810 are for purposes of the third entity's operations.

Figure 9:
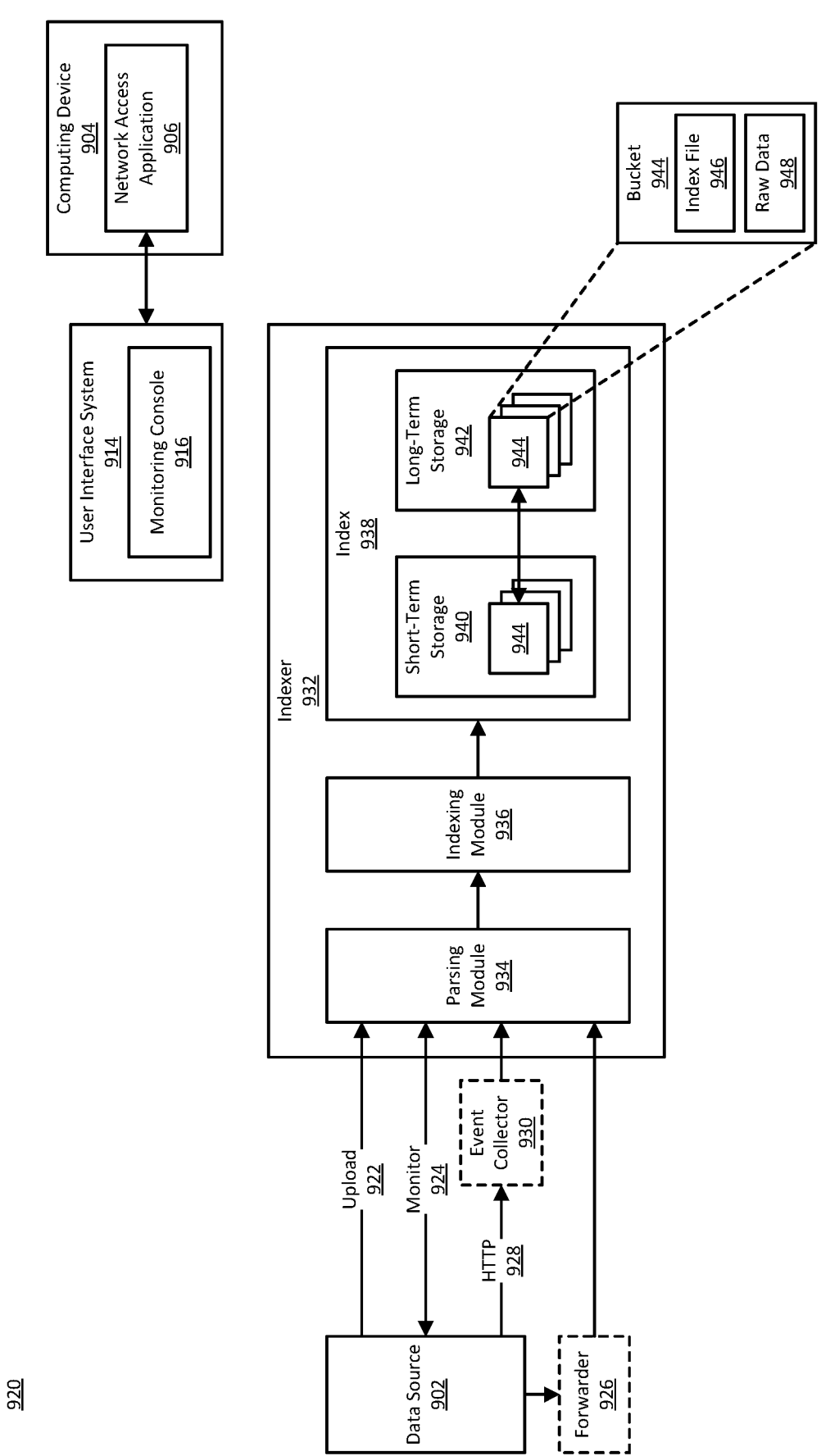
FIG. 9 is a block diagram illustrating in greater detail an example of an indexing system of a data intake and query system according to some examples.

FIG. 9 is a block diagram illustrating in greater detail an example of an indexing system 920 of a data intake and query system, such as the data intake and query system 810 of FIG. 8. The indexing system 920 of FIG. 9 uses various methods to obtain machine data from a data source 902 and stores the data in an index 938 of an indexer 932. As discussed previously, a data source is a hardware, software, physical, and/or virtual component of a computing device that produces machine data in an automated fashion and/or as a result of user interaction. Examples of data sources include files and directories; network event logs; operating system logs, operational data, and performance monitoring data; metrics; first-in, first-out queues; scripted inputs; and modular inputs, among others. The indexing system 920 enables the data intake and query system to obtain the machine data produced by the data source 902 and to store the data for searching and retrieval.

Users can administer the operations of the indexing system 920 using a computing device 904 that can access the indexing system 920 through a user interface system 914 of the data intake and query system. For example, the computing device 904 can be executing a network access application 906, such as a web browser or a terminal, through which a user can access a monitoring console 916 provided by the user interface system 914. The monitoring console 916 can enable operations such as: identifying the data source 902 for indexing; configuring the indexer 932 to index the data from the data source 932; configuring a data ingestion method; configuring, deploying, and managing clusters of indexers; and viewing the topology and performance of a deployment of the data intake and query system, among other operations. The operations performed by the indexing system 920 may be referred to as "index time" operations, which are distinct from "search time" operations that are discussed further below.

The indexer 932, which may be referred to herein as a data indexing component, coordinates and performs most of the index time operations. The indexer 932 can be implemented using program code that can be executed on a computing device. The program code for the indexer 932 can be stored on a non-transitory computer-readable medium (e.g. a magnetic, optical, or solid state storage disk, a flash memory, or another type of non-transitory storage media), and from this medium can be loaded or copied to the memory of the computing device. One or more hardware processors of the computing device can read the program code from the memory and execute the program code in order to implement the operations of the indexer 932. In some implementations, the indexer 932 executes on the computing device 904 through which a user can access the indexing system 920. In some implementations, the indexer 932 executes on a different computing device.

The indexer 932 may be executing on the computing device that also provides the data source 902 or may be executing on a different computing device. In implementations wherein the indexer 932 is on the same computing device as the data source 902, the data produced by the data source 902 may be referred to as "local data." In other implementations the data source 902 is a component of a first computing device and the indexer 932 executes on a second computing device that is different from the first computing device. In these implementations, the data produced by the data source 902 may be referred to as "remote data." In some implementations, the first computing device is "on-prem" and in some implementations the first computing device is "in the cloud." In some implementations, the indexer 932 executes on a computing device in the cloud and the operations of the indexer 932 are provided as a service to entities that subscribe to the services provided by the data intake and query system.

For a given data produced by the data source 902, the indexing system 920 can be configured to use one of several methods to ingest the data into the indexer 932. These methods include upload 922, monitor 924, using a forwarder 926, or using HyperText Transfer Protocol (HTTP 928) and an event collector 930. These and other methods for data ingestion may be referred to as "getting data in" (GDI) methods.

Using the upload 922 method, a user can instruct the indexing system to 902 to specify a file for uploading into the indexer 932. For example, the monitoring console 916 can include commands or an interface through which the user can specify where the file is located (e.g., on which computing device and/or in which directory of a file system) and the name of the file. Once uploading is initiated, the indexer 932 processes the file, as discussed further below. Uploading is a manual process and occurs when instigated by a user. For automated data ingestion, the other ingestion methods are used.

The monitor 924 method enables the indexing system 902 to monitor the data source 902 and continuously or periodically obtain data produced by the data source 902 for ingestion by the indexer 932. For example, using the monitoring console 916, a user can specify a file or directory for monitoring. In this example, the indexing system 902 can execute a monitoring process that detects whenever data is added to the file or directory and causes the data to be sent to the indexer 932. As another example, a user can specify a network port for monitoring. In this example, a monitoring process can capture data received at or transmitting from the network port and cause the data to be sent to the indexer 932. In various examples, monitoring can also be configured for data sources such as operating system event logs, performance data generated by an operating system, operating system registries, operating system directory services, and other data sources.

Monitoring is available when the data source 902 is local to the indexer 932 (e.g., the data source 902 is on the computing device where the indexer 932 is executing). Other data ingestion methods, including forwarding and the event collector 930, can be used for either local or remote data sources.

A forwarder 926, which may be referred to herein as a data forwarding component, is a software process that sends data from the data source 902 to the indexer 932. The forwarder 926 can be implemented using program code that can be executed on the computer device that provides the data source 902. A user launches the program code for the forwarder 926 on the computing device that provides the data source 902. The user can further configure the program code, for example to specify a receiver for the data being forwarded (e.g., one or more indexers, another forwarder, and/or another recipient system), to enable or disable data forwarding, and to specify a file, directory, network events, operating system data, or other data to forward, among other operations.

The forwarder 926 can provide various capabilities. For example, the forwarder 926 can send the data unprocessed or can perform minimal processing on the data. Minimal processing can include, for example, adding metadata tags to the data to identify a source, source type, and/or host, among other information, dividing the data into blocks, and/or applying a timestamp to the data. In some implementations, the forwarder 926 can break the data into individual events (event generation is discussed further below) and send the events to a receiver. Other operations that the forwarder 926 may be configured to perform include buffering data, compressing data, and using secure protocols for sending the data, for example.

Forwarders can be configured in various topologies. For example, multiple forwarders can send data to the same indexer. As another example, a forwarder can be configured to filter and/or route events to specific receivers (e.g., different indexers), and/or discard events. As another example, a forwarder can be configured to send data to another forwarder, or to a receiver that is not an indexer or a forwarder (such as, for example, a log aggregator).

The event collector 930 provides an alternate method for obtaining data from the data source 902. The event collector 930 enables data and application events to be sent to the indexer 932 using HTTP 928. The event collector 930 can be implemented using program code that can be executing on a computing device. The program code may be a component of the data intake and query system or can be a standalone component that can be executed independently of the data intake and query system and operates in cooperation with the data intake and query system.

To use the event collector 930, a user can, for example using the monitoring console 916 or a similar interface provided by the user interface system 914, enable the event collector 930 and configure an authentication token. In this context, an authentication token is a piece of digital data generated by a computing device, such as a server, that contains information to identify a particular entity, such as a user or a computing device, to the server. The token will contain identification information for the entity (e.g., an alphanumeric string that is unique to each token) and a code that authenticates the entity with the server. The token can be used, for example, by the data source 902 as an alternative method to using a username and password for authentication.

To send data to the event collector 930, the data source 902 is supplied with a token and can then send HTTP 928 requests to the event collector 930. To send HTTP 928 requests, the data source 902 can be configured to use an HTTP client and/or to use logging libraries such as those supplied by Java, JavaScript, and .NET libraries. An HTTP client enables the data source 902 to send data to the event collector 930 by supplying the data, and a Uniform Resource Identifier (URI) for the event collector 930 to the HTTP client. The HTTP client then handles establishing a connection with the event collector 930, transmitting a request containing the data, closing the connection, and receiving an acknowledgment if the event collector 930 sends one. Logging libraries enable HTTP 928 requests to the event collector 930 to be generated directly by the data source. For example, an application can include or link a logging library, and through functionality provided by the logging library manage establishing a connection with the event collector 930, transmitting a request, and receiving an acknowledgement.

An HTTP 928 request to the event collector 930 can contain a token, a channel identifier, event metadata, and/or event data. The token authenticates the request with the event collector 930. The channel identifier, if available in the indexing system 920, enables the event collector 930 to segregate and keep separate data from different data sources. The event metadata can include one or more key-value pairs that describe the data source 902 or the event data included in the request. For example, the event metadata can include key-value pairs specifying a timestamp, a hostname, a source, a source type, or an index where the event data should be indexed. The event data can be a structured data object, such as a JavaScript Object Notation (JSON) object, or raw text. The structured data object can include both event data and event metadata. Additionally, one request can include event data for one or more events.

In some implementations, the event collector 930 extracts events from HTTP 928 requests and sends the events to the indexer 932. The event collector 930 can further be configured to send events or event data to one or more indexers. Extracting the events can include associating any metadata in a request with the event or events included in the request. In these implementations, event generation by the indexer 932 (discussed further below) is bypassed, and the indexer 932 moves the events directly to indexing. In some implementations, the event collector 930 extracts event data from a request and outputs the event data to the indexer 932, and the indexer generates events from the event data. In some implementations, the event collector 930 sends an acknowledgement message to the data source 902 to indicate that the event collector 930 has received a particular request form the data source 902, and/or to indicate to the data source 902 that events in the request have been added to an index.

The indexer 932 ingests incoming data and transforms the data into searchable knowledge in the form of events. In the data intake and query system, an event is a single piece of data that represents activity of the component represented in FIG. 9 by the data source 902. An event can be, for example, a single record in a log file that records a single action performed by the component (e.g., a user login, a disk read, transmission of a network packet, etc.). An event includes one or more fields that together describe the action captured by the event, where a field is a key-value pair (also referred to as a name-value pair). In some cases, an event includes both the key and the value, and in some cases the event includes only the value and the key can be inferred or assumed.

Transformation of data into events can include event generation and event indexing. Event generation includes identifying each discrete piece of data that represents one event and associating each event with a timestamp and possibly other information (which may be referred to herein as metadata). Event indexing includes storing of each event in the data structure of an index. As an example, the indexer 932 can include a parsing module 934 and an indexing module 936 for generating and storing the events. The parsing module 934 and indexing module 936 can be modular and pipelined, such that one component can be operating on a first set of data while the second component is simultaneously operating on a second sent of data. Additionally, the indexer 932 may at any time have multiple instances of the parsing module 934 and indexing module 936, with each set of instances configured to simultaneously operate on data from the same data source or from different data sources. The parsing module 934 and indexing module 936 are illustrated to facilitate discussion, with the understanding that implementations with other components are possible to achieve the same functionality.

The parsing module 934 determines information about event data, where the information can be used to identify events within the event data. For example, the parsing module 934 can associate a source type with the event data. A source type identifies the data source 902 and describes a possible data structure of event data produced by the data source 902. For example, the source type can indicate which fields to expect in events generated at the data source 902 and the keys for the values in the fields, and possibly other information such as sizes of fields, an order of the fields, a field separator, and so on. The source type of the data source 902 can be specified when the data source 902 is configured as a source of event data. Alternatively, the parsing module 934 can determine the source type from the event data, for example from an event field or using machine learning.

Other information that the parsing module 934 can determine includes timestamps. In some cases, an event includes a timestamp as a field, and the timestamp indicates a point in time when the action represented by the event occurred or was recorded by the data source 902 as event data. In these cases, the parsing module 934 may be able to determine from the source type associated with the event data that the timestamps can be extracted from the events themselves. In some cases, an event does not include a timestamp and the parsing module 934 determines a timestamp for the event, for example from a name associated with the event data from the data source 902 (e.g., a file name when the event data is in the form of a file) or a time associated with the event data (e.g., a file modification time). As another example, when the parsing module 934 is not able to determine a timestamp from the event data, the parsing module 934 may use the time at which it is indexing the event data. As another example, the parsing module 934 can use a user-configured rule to determine the timestamps to associate with events.

The parsing module 934 can further determine event boundaries. In some cases, a single line (e.g., a sequence of characters ending with a line termination) in event data represents one event while in other cases, a single line represents multiple events. In yet other cases, one event may span multiple lines within the event data. The parsing module 934 may be able to determine event boundaries from the source type associated with the event data, for example from a data structure indicated by the source type. In some implementations, a user can configure rules the parsing module 934 can use to identify event boundaries.

The parsing module 934 can further extract data from events and possibly also perform transformations on the events. For example, the parsing module 934 can extract a set of fields for each event, such as a host or hostname, source or source name, and/or source type. The parsing module 934 may extract certain fields by default or based on a user configuration. Alternatively or additionally, the parsing module 934 may add fields to events, such as a source type or a user-configured field. As another example of a transformation, the parsing module 934 can anonymize fields in events to mask sensitive information, such as social security numbers or account numbers. Anonymizing fields can include changing or replacing values of specific fields. The parsing component 934 can further perform user-configured transformations.

The parsing module 934 outputs the results of processing incoming event data to the indexing module 936, which performs event segmentation and builds index data structures.

Event segmentation identifies searchable segments, which may alternatively be referred to as searchable terms or keywords, which can be used by the search system of the data intake and query system to search the event data. A searchable segment may be a part of a field in an event or an entire field. The indexer 932 can be configured to identify searchable segments that are parts of fields, searchable segments that are entire fields, or both. The parsing module 934 organizes the searchable segments into a lexicon or dictionary for the event data, with the lexicon including each searchable segment and a reference to the location of each occurrence of the searchable segment within the event data. As discussed further below, the search system can use the lexicon, which is stored in an index file 946, to find event data that matches a search query. In some implementations, segmentation can alternatively be performed by the forwarder 926. Segmentation can also be disabled, in which case the indexer 932 will not build a lexicon for the event data. When segmentation is disabled, the search system searches the event data directly.

Building index data structures generates the index 938. The index 938 is a storage data structure on a storage device (e.g., a disk drive or other physical device for storing digital data). The storage device may be a component of the computing device on which the indexer 932 is operating (referred to herein as local storage) or may be a component of a different computing device (referred to herein as remote storage) that the indexer 938 has access to over a network. The indexer 932 can include more than one index and can include indexes of different types. For example, the indexer 932 can include event indexes, which impose minimal structure on stored data and can accommodate any type of data. As another example, the indexer 932 can include metrics indexes, which use a highly structured format to handle the higher volume and lower latency demands associated with metrics data.

The indexing module 936 organizes files in the index 938 in directories referred to as buckets. The files in a bucket 944 can include raw data files, index files, and possibly also other metadata files. As used herein, "raw data" means data as when the data was produced by the data source 902, without alteration to the format or content. As noted previously, the parsing component 934 may add fields to event data and/or perform transformations on fields in the event data, and thus a raw data file 948 can include, in addition to or instead of raw data, what is referred to herein as enriched raw data. The raw data file 948 may be compressed to reduce disk usage. An index file 946, which may also be referred to herein as a "time-series index" or tsidx file, contains metadata that the indexer 932 can use to search a corresponding raw data file 948. As noted above, the metadata in the index file 946 includes a lexicon of the event data, which associates each unique keyword in the event data in the raw data file 948 with a reference to the location of event data within the raw data file 948. The keyword data in the index file 946 may also be referred to as an inverted index. In various implementations, the data intake and query system can use index files for other purposes, such as to store data summarizations that can be used to accelerate searches.

A bucket 944 includes event data for a particular range of time. The indexing module 936 arranges buckets in the index 938 according to the age of the buckets, such that buckets for more recent ranges of time are stored in short-term storage 940 and buckets for less recent ranges of time are stored in long-term storage 942. Short-term storage 940 may be faster to access while long-term storage 942 may be slower to access. Buckets may move from short-term storage 940 to long-term storage 942 according to a configurable data retention policy, which can indicate at what point in time a bucket is old enough to be moved.

A bucket's location in short-term storage 940 or long-term storage 942 can also be indicated by the bucket's status. As an example, a bucket's status can be "hot," "warm," "cold," "frozen," or "thawed." In this example, hot bucket is one to which the indexer 932 is writing data and the bucket becomes a warm bucket when the index 932 stops writing data to it. In this example, both hot and warm buckets reside in short-term storage 940. Continuing this example, when a warm bucket is moved to long-term storage 942, the bucket becomes a cold bucket. A cold bucket can become a frozen bucket after a period of time, at which point the bucket may be deleted or archived. An archived bucket cannot be searched. When an archived bucket is retrieved for searching, the bucket becomes thawed and can then be searched.

The indexing system 920 can include more than one indexer, where a group of indexers is referred to as an index cluster. The indexers in an index cluster may also be referred to as peer nodes. In an index cluster, the indexers are configured to replicate each other's data by copying buckets from one indexer to another. The number of copies of a bucket can configured (e.g., three copies of each buckets must exist within the cluster), and indexers to which buckets are copied may be selected to optimize distribution of data across the cluster.

A user can view the performance of the indexing system 920 through the monitoring console 916 provided by the user interface system 914. Using the monitoring console 916, the user can configure and monitor an index cluster, and see information such as disk usage by an index, volume usage by an indexer, index and volume size over time, data age, statistics for bucket types, and bucket settings, among other information.

Figure 10:
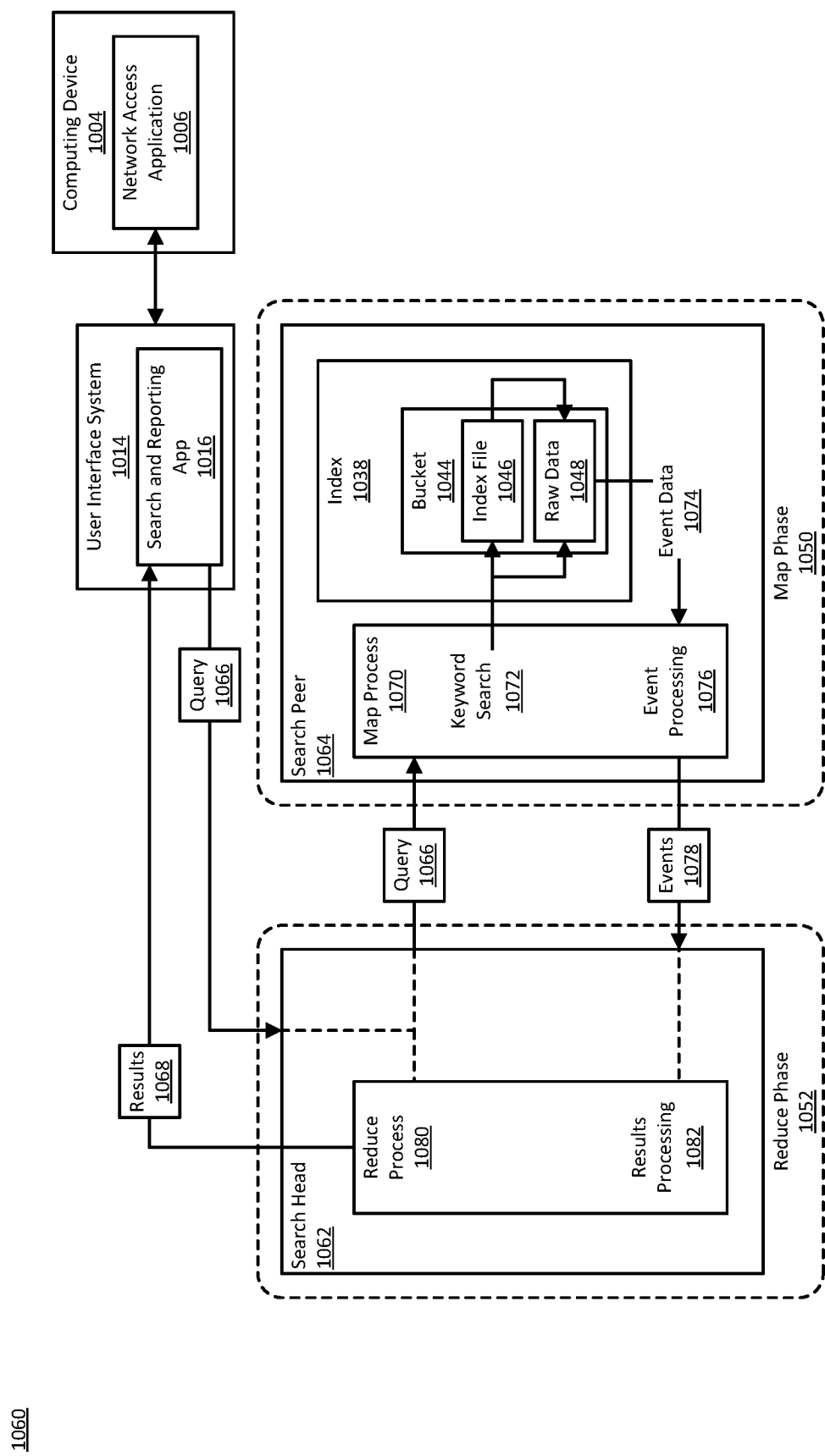
FIG. 10 is a block diagram illustrating in greater detail an example of the search system of a data intake and query system according to some examples.

FIG. 10 is a block diagram illustrating in greater detail an example of the search system 1060 of a data intake and query system, such as the data intake and query system 810 of FIG. 8. The search system 1060 of FIG. 10 issues a query 1066 to a search head 1062, which sends the query 1066 to a search peer 1064. Using a map process 1070, the search peer 1064 searches the appropriate index 1038 for events identified by the query 1066 and sends events 1078 so identified back to the search head 1062. Using a reduce process 1082, the search head 1062 processes the events 1078 and produces results 1068 to respond to the query 1066. The results 1068 can provide useful insights about the data stored in the index 1038. These insights can aid in the administration of information technology systems, in security analysis of information technology systems, and/or in analysis of the development environment provided by information technology systems.

The query 1066 that initiates a search is produced by a search and reporting app 1016 that is available through the user interface system 1014 of the data intake and query system. Using a network access application 1006 executing on a computing device 1004, a user can input the query 1066 into a search field provided by the search and reporting app 1016. Alternatively or additionally, the search and reporting app 1016 can include pre-configured queries or stored queries that can be activated by the user. In some cases, the search and reporting app 1016 initiates the query 1066 when the user enters the query 1066. In these cases, the query 1066 maybe referred to as an "ad-hoc" query. In some cases, the search and reporting app 1016 initiates the query 1066 based on a schedule. For example, the search and reporting app 1016 can be configured to execute the query 1066 once per hour, once per day, at a specific time, on a specific date, or at some other time that can be specified by a date, time, and/or frequency. These types of queries maybe referred to as scheduled queries.

The query 1066 is specified using a search processing language. The search processing language includes commands that the search peer 1064 will use to identify events to return in the search results 1068. The search processing language can further include commands for filtering events, extracting more information from events, evaluating fields in events, aggregating events, calculating statistics over events, organizing the results, and/or generating charts, graphs, or other visualizations, among other examples. Some search commands may have functions and arguments associated with them, which can, for example, specify how the commands operate on results and which fields to act upon. The search processing language may further include constructs that enable the query 1066 to include sequential commands, where a subsequent command may operate on the results of a prior command. As an example, sequential commands may be separated in the query 1066 by a vertical line ("I" or "pipe") symbol.

In addition to one or more search commands, the query 1066 includes a time indicator. The time indicator limits searching to events that have timestamps described by the indicator. For example, the time indicator can indicate a specific point in time (e.g., 10:00:00 am today), in which case only events that have the point in time for their timestamp will be searched. As another example, the time indicator can indicate a range of time (e.g., the last 24 hours), in which case only events whose timestamps fall within the range of time will be searched. The time indicator can alternatively indicate all of time, in which case all events will be searched.

Processing of the search query 1066 occurs in two broad phases: a map phase 1050 and a reduce phase 1052. The map phase 1050 takes place across one or more search peers. In the map phase 1050, the search peers locate event data that matches the search terms in the search query 1066 and sorts the event data into field-value pairs. When the map phase 1050 is complete, the search peers send events that they have found to one or more search heads for the reduce phase 1052. During the reduce phase 1052, the search heads process the events through commands in the search query 1066 and aggregate the events to produce the final search results 1068.

A search head, such as the search head 1062 illustrated in FIG. 10, is a component of the search system 1060 that manages searches. The search head 1062, which may also be referred to herein as a search management component, can be implemented using program code that can be executed on a computing device. The program code for the search head 1062 can be stored on a non-transitory computer-readable medium and from this medium can be loaded or copied to the memory of a computing device. One or more hardware processors of the computing device can read the program code from the memory and execute the program code in order to implement the operations of the search head 1062.

Upon receiving the search query 1066, the search head 1062 directs the query 1066 to one or more search peers, such as the search peer 1064 illustrated in FIG. 10. "Search peer" is an alternate name for "indexer" and a search peer may be largely similar to the indexer described previously. The search peer 1064 may be referred to as a "peer node" when the search peer 1064 is part of an indexer cluster. The search peer 1064, which may also be referred to as a search execution component, can be implemented using program code that can be executed on a computing device. In some implementations, one set of program code implements both the search head 1062 and the search peer 1064 such that the search head 1062 and the search peer 1064 form one component. In some implementations, the search head 1062 is an independent piece of code that performs searching and no indexing functionality. In these implementations, the search head 1062 may be referred to as a dedicated search head.

The search head 1062 may consider multiple criteria when determining whether to send the query 1066 to the particular search peer 1064. For example, the search system 1060 may be configured to include multiple search peers that each have duplicative copies of at least some of the event data. In this example, the sending the search query 1066 to more than one search peer allows the search system 1060 to distribute the search workload across different hardware resources. As another example, search system 1060 may include different search peers for different purposes (e.g., one has an index storing a first type of data or from a first data source while a second has an index storing a second type of data or from a second data source). In this example, the search query 1066 may specify which indexes to search, and the search head 1062 will send the query 1066 to the search peers that have those indexes.

To identify events 1078 to send back to the search head 1062, the search peer 1064 performs a map process 1070 to obtain event data 1074 from the index 1038 that is maintained by the search peer 1064. During a first phase of the map process 1070, the search peer 1064 identifies buckets that have events that are described by the time indicator in the search query 1066. As noted above, a bucket contains events whose timestamps fall within a particular range of time. For each bucket 1044 whose events can be described by the time indicator, during a second phase of the map process 1070, the search peer 1064 performs a keyword search 1074 using search terms specified in the search query 1066. The search terms can be one or more of keywords, phrases, fields, Boolean expressions, and/or comparison expressions that in combination describe events being searched for. When segmentation is enabled at index time, the search peer 1064 performs the keyword search 1072 on the bucket's index file 1046. As noted previously, the index file 1046 includes a lexicon of the searchable terms in the events stored in the bucket's raw data 1048 file. The keyword search 1072 searches the lexicon for searchable terms that correspond to one or more of the search terms in the query 1066. As also noted above, the lexicon incudes, for each searchable term, a reference to each location in the raw data 1048 file where the searchable term can be found. Thus, when the keyword search identifies a searchable term in the index file 1046 that matches query 1066, the search peer 1064 can use the location references to extract from the raw data 1048 file the event data 1074 for each event that include the searchable term.

In cases where segmentation was disabled at index time, the search peer 1064 performs the keyword search 1072 directly on the raw data 1048 file. To search the raw data 1048, the search peer 1064 may identify searchable segments in events in a similar manner as when the data was indexed. Thus, depending on how the search peer 1064 is configured, the search peer 1064 may look at event fields and/or parts of event fields to determine whether an event matches the query 1066. Any matching events can be added to the event data 1074 read from the raw data 1048 file. The search peer 1064 can further be configured to enable segmentation at search time, so that searching of the index 1038 causes the search peer 1064 to build a lexicon in the index file 1046.

The event data 1074 obtained from the raw data 1048 file includes the full text of each event found by the keyword search 1072. During a third phase of the map process 1070, the search peer 1064 performs event processing 1076 on the event data 1074, with the steps performed being determined by the configuration of the search peer 1064 and/or commands in the search query 1066. For example, the search peer 1064 can be configured to perform field discovery and field extraction. Field discovery is a process by which the search peer 1064 identifies and extracts key-value pairs from the events in the event data 1074. The search peer 1064 can, for example, be configured to automatically extract the first 100 fields (or another number of fields) in the event data 1074 that can be identified as key-value pairs. As another example, the search peer 1064 can extract any fields explicitly mentioned in the search query 1066. The search peer 1064 can, alternatively or additionally, be configured with particular field extractions to perform.

Other examples of steps that can be performed during event processing 1076 include: field aliasing (assigning an alternate name to a field); addition of fields from lookups (adding fields from an external source to events based on existing field values in the events); associating event types with events; source type renaming (changing the name of the source type associated with particular events); and tagging (adding one or more strings of text, or a "tags" to particular events), among other examples.

The search peer 1064 sends processed events 1078 to the search head 1062, which performs a reduce process 1080. The reduce process 1080 potentially receives events from multiple search peers and performs various results processing 1082 steps on the events. The results processing 1082 steps can include, for example, aggregating the events from different search peers into a single set of events, deduplicating and aggregating fields discovered by different search peers, counting the number of events found, and sorting the events by timestamp (e.g., newest first or oldest first), among other examples. Results processing 1082 can further include applying commands from the search query 1066 to the events. The query 1066 can include, for example, commands for evaluating and/or manipulating fields (e.g., to generate new fields from existing fields or parse fields that have more than one value). As another example, the query 1066 can include commands for calculating statistics over the events, such as counts of the occurrences of fields, or sums, averages, ranges, and so on, of field values. As another example, the query 1066 can include commands for generating statistical values for purposes of generating charts of graphs of the events.

Through results processing 1082, the reduce process 1080 produces the events found by processing the search query 1066, as well as some information about the events, which the search head 1062 outputs to the search and reporting app 1016 as search results 1068. The search and reporting app 1016 can generate visual interfaces for viewing the search results 1068. The search and reporting app 1016 can, for example, output visual interfaces for the network access application 1006 running on a computing device 1004 to generate.

The visual interfaces can include various visualizations of the search results 1068, such as tables, line or area charts, Choropleth maps, or single values. The search and reporting app 1016 can organize the visualizations into a dashboard, where the dashboard includes a panel for each visualization. A dashboard can thus include, for example, a panel listing the raw event data for the events in the search results 1068, a panel listing fields extracted at index time and/or found through field discovery along with statistics for those fields, and/or a timeline chart indicating how many events occurred at specific points in time (as indicated by the timestamps associated with each event). In various implementations, the search and reporting app 1016 can provide one or more default dashboards. Alternatively or additionally, the search and reporting app 1016 can include functionality that enables a user to configure custom dashboards.

The search and reporting app 1016 can also enable further investigation into the events in the search results 1016. The process of further investigation may be referred to as drill-down. For example, a visualization in a dashboard can include interactive elements, which, when selected, provide options for finding out more about the data being displayed by the interactive elements. To find out more, an interactive element can, for example, generate a new search that includes some of the data being displayed by the interactive element, and thus may be more focused than the initial search query 1066. As another example, an interactive element can launch a different dashboard whose panels include more detailed information about the data that is displayed by the interactive element. Other examples of actions that can be performed by interactive elements in a dashboard include opening a link, playing an audio or video file, or launching another application, among other examples.

Various examples and possible implementations have been described above, which recite certain features and/or functions. Although these examples and implementations have been described in language specific to structural features and/or functions, it is understood that the subject matter defined in the appended claims is not necessarily limited to the specific features or functions described above. Rather, the specific features and functions described above are disclosed as examples of implementing the claims, and other equivalent features and acts are intended to be within the scope of the claims. Further, any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Processing of the various components of systems illustrated herein can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Examples have been described with reference to flow chart illustrations and/or block diagrams of methods, apparatus (systems), and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

What is claimed is:

1. A computer-implemented method, comprising:
obtaining, by a software agent associated with a software development observability platform, data generated by a component of a continuous integration and continuous deployment (CI/CD) pipeline managed by a software development observability platform, wherein the component of the CI/CD pipeline is invoked based on changes to source code associated with a software project, and wherein the software agent is associated with configuration information identifying: one or more types of data to extract from artifacts generated by components of the CI/CD pipeline, and a destination to which to send data extracted by the software agent;
generating a timestamped event based on the data, wherein a format of the timestamped event is based on a type of the component of the CI/CD pipeline; and
sending the timestamped event to the destination identified in the configuration information.

2. The computer-implemented method of claim 1, further comprising adding, to the timestamped event, metadata obtained from the software development observability platform, wherein the metadata includes at least one of: an identifier of the CI/CD pipeline, an identifier of the component of the CI/CD pipeline, an identifier of a user who submitted the changes to the source code, an identifier of a repository to which the changes to the source code were submitted, an identifier of a version control branch with which the changes to the source code are associated, or a type of test framework that generated the data.

3. The computer-implemented method of claim 1, wherein the data generated by the component of the CI/CD pipeline is associated with a first type of test framework, wherein the software agent obtains data generated by a plurality of types of components of the CI/CD pipeline, and wherein the plurality of types of components of the CI/CD pipeline include at least one of: one or more second types of test frameworks, a code coverage tool, a type checking tool, or a static analysis tool.

4. The computer-implemented method of claim 1, wherein the data generated by the component of the CI/CD pipeline is first data associated with a first type of test framework, wherein the timestamped event is a first timestamped event, and wherein the method further comprises:
obtaining, by the software agent, second data generated by a second type of test framework that is different from the first type of test framework;
generating a second timestamped event based on the second data generated by the second type of test framework, wherein the format of the second timestamped event is the same as the format of the first timestamped event; and
sending the second timestamped event to the destination identified in the configuration information.

5. The computer-implemented method of claim 1, further comprising generating, based on the data generated by the component of the CI/CD pipeline, a hierarchy of timestamped events including the timestamped event, wherein levels of the hierarchy of timestamped events represent successively granular details of the data generated by the component of the CI/CD pipeline.

6. The computer-implemented method of claim 1, wherein the destination is a data intake and query system, and wherein the data intake and query system indexes the timestamped event in a searchable data store.

7. The computer-implemented method of claim 1, further comprising:
generating, by the software agent, a plurality of timestamped events based on data generated during multiple invocations of the CI/CD pipeline at different points in time; and
causing display of a graphical user interface (GUI) including information derived from the plurality of timestamped events.

8. The computer-implemented method of claim 1, further comprising:
adding, to the timestamped event, metadata obtained from the software development observability platform;
causing display of a graphical user interface (GUI) including information derived from timestamped events including the timestamped event;
receiving input requesting to filter information displayed in the GUI based on a field of the metadata obtained from the software development observability platform; and
filtering display of the information derived from the timestamped events based on the field of the metadata.

9. The computer-implemented method of claim 1, wherein the timestamped event relates to data generated by a test framework of the CI/CD pipeline, wherein the software agent generates a plurality of timestamped events based on the data generated by the test framework, and wherein the method further comprises causing displaying of a graphical user interface (GUI) including an indication, based on the plurality of timestamped events, of a failure rate associated with one or more test cases executed by the test framework.

10. The computer-implemented method of claim 1, wherein the timestamped event relates to data generated by a code coverage tool, wherein the software agent generates a plurality of timestamped events based on data generated by the code coverage tool over multiple invocations of the CI/CD pipeline, and wherein the method further comprising causing display of a graphical user interface (GUI) including a graph of code coverage for the software project over time based on the plurality of timestamped events.

11. A computing device, comprising:
a processor; and
a non-transitory computer-readable medium having stored thereon instructions that, when executed by the processor, cause the computing device to perform operations including:
obtaining, by a software agent associated with a software development observability platform, data generated by a component of a continuous integration and continuous deployment (CI/CD) pipeline managed by a software development observability platform, wherein the component of the CI/CD pipeline is invoked based on changes to source code associated with a software project, and wherein the software agent is associated with configuration information identifying: one or more types of data to extract from artifacts generated by components of the CI/CD pipeline, and a destination to which to send data extracted by the software agent;
generating a timestamped event based on the data, wherein a format of the timestamped event is based on a type of the component of the CI/CD pipeline; and sending the timestamped event to the destination identified in the configuration information.

12. The computing device of claim 11, wherein the instructions, when executed by the processor, further cause the processor to perform operations including adding, to the timestamped event, metadata obtained from the software development observability platform, wherein the metadata includes at least one of: an identifier of the CI/CD pipeline, an identifier of the component of the CI/CD pipeline, an identifier of a user who submitted the changes to the source code, an identifier of a repository to which the changes to the source code were submitted, an identifier of a version control branch with which the changes to the source code are associated, or a type of test framework that generated the data.

13. The computing device of claim 11, wherein the data generated by the component of the CI/CD pipeline is associated with a first type of test framework, wherein the software agent obtains data generated by a plurality of types of components of the CI/CD pipeline, and wherein the plurality of types of components of the CI/CD pipeline include at least one of: one or more second types of test frameworks, a code coverage tool, a type checking tool, or a static analysis tool.

14. The computing device of claim 11, wherein the data generated by the component of the CI/CD pipeline is first data associated with a first type of test framework, wherein the timestamped event is a first timestamped event, and wherein the instructions, when executed by the processor, further cause the processor to perform operations including:
 obtaining, by the software agent, second data generated by a second type of test framework that is different from the first type of test framework;
 generating a second timestamped event based on the second data generated by the second type of test framework, wherein the format of the second timestamped event is the same as the format of the first timestamped event; and
 sending the second timestamped event to the destination identified in the configuration information.

15. The computing device of claim 11, wherein the instructions, when executed by the processor, further cause the processor to perform operations including generating, based on the data generated by the component of the CI/CD pipeline, a hierarchy of timestamped events including the timestamped event, wherein levels of the hierarchy of timestamped events represent successively granular details of the data generated by the component of the CI/CD pipeline.

16. A non-transitory computer-readable medium having stored thereon instructions that, when executed by one or more processors of one or more computing devices, cause the one or more computing devices to perform operations including:
 obtaining, by a software agent associated with a software development observability platform, data generated by a component of a continuous integration and continuous deployment (CI/CD) pipeline managed by a software development observability platform, wherein the component of the CI/CD pipeline is invoked based on changes to source code associated with a software project, and wherein the software agent is associated with configuration information identifying: one or more types of data to extract from artifacts generated by components of the CI/CD pipeline, and a destination to which to send data extracted by the software agent;
 generating a timestamped event based on the data, wherein a format of the timestamped event is based on a type of the component of the CI/CD pipeline; and
 sending the timestamped event to the destination identified in the configuration information.

17. The non-transitory computer-readable medium of claim 16, wherein the instructions, when executed by the one or more processors, further cause the one or more computing devices to perform operations including adding, to the timestamped event, metadata obtained from the software development observability platform, wherein the metadata includes at least one of: an identifier of the CI/CD pipeline, an identifier of the component of the CI/CD pipeline, an identifier of a user who submitted the changes to the source code, an identifier of a repository to which the changes to the source code were submitted, an identifier of a version control branch with which the changes to the source code are associated, or a type of test framework that generated the data.

18. The non-transitory computer-readable medium of claim 16, wherein the data generated by the component of the CI/CD pipeline is associated with a first type of test framework, wherein the software agent obtains data generated by a plurality of types of components of the CI/CD pipeline, and wherein the plurality of types of components of the CI/CD pipeline include at least one of: one or more second types of test frameworks, a code coverage tool, a type checking tool, or a static analysis tool.

19. The non-transitory computer-readable medium of claim 16, wherein the data generated by the component of the CI/CD pipeline is first data associated with a first type of test framework, wherein the timestamped event is a first timestamped event, and wherein the instructions, when executed by the one or more processors, further cause the one or more computing devices to perform operations including:
 obtaining, by the software agent, second data generated by a second type of test framework that is different from the first type of test framework;
 generating a second timestamped event based on the second data generated by the second type of test framework, wherein the format of the second timestamped event is the same as the format of the first timestamped event; and
 sending the second timestamped event to the destination identified in the configuration information.

20. The non-transitory computer-readable medium of claim 16, wherein the instructions, when executed by the one or more processors, further cause the one or more computing devices to perform operations including generating, based on the data generated by the component of the CI/CD pipeline, a hierarchy of timestamped events including the timestamped event, wherein levels of the hierarchy of timestamped events represent successively granular details of the data generated by the component of the CI/CD pipeline.

* * * * *